US010089862B2

(12) United States Patent
Singh et al.

(10) Patent No.: US 10,089,862 B2
(45) Date of Patent: Oct. 2, 2018

(54) PEDESTRIAN ALERTS FOR MOBILE DEVICES

(71) Applicant: Microsoft Technology Licensing, LLC, Redmond, WA (US)

(72) Inventors: Parmjeet Singh, Bellevue, WA (US); Lakshmi Narayana Mummidi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/334,826

(22) Filed: Oct. 26, 2016

(65) Prior Publication Data

US 2018/0114435 A1    Apr. 26, 2018

(51) Int. Cl.
*G08G 1/005*    (2006.01)
*G06F 3/01*    (2006.01)
(Continued)

(52) U.S. Cl.
CPC ............ *G08G 1/005* (2013.01); *G06F 3/013* (2013.01); *G06F 3/016* (2013.01); *G06F 3/0481* (2013.01); *G06F 3/167* (2013.01); *G06F 3/04883* (2013.01)

(58) Field of Classification Search
CPC .............................. G08G 1/166; G08G 1/005
See application file for complete search history.

(56) References Cited

U.S. PATENT DOCUMENTS 7,095,336 B2    8/2006    Rodgers et al.
7,486,204 B2    2/2009    Quintos
(Continued)

FOREIGN PATENT DOCUMENTS

CN    104900076 A    9/2015
DE    102007000633 B3    4/2009
WO    2007110654 A1    10/2007

OTHER PUBLICATIONS

Liao, Chen-Fu, "Using a Smartphone App to Assist the Visually Impaired at Signalized Intersections", In Technical Report of CTS 12-25, Aug. 2012, (102 pages total).
(Continued)

*Primary Examiner* — Hongmin Fan
(74) *Attorney, Agent, or Firm* — Mark K. Young; Mayer & Williams PC

(57) ABSTRACT

A pedestrian alert system supported on a mobile device such as a smartphone, tablet computer, or a wearable computing device which is employed by a user to engage in various activities, is configured to provide visual, auditory, or haptic alerts when the system uses location sensing and map data to determine the user's proximity to a pedestrian street crossing. The alert attracts the user's attention by having the user perform an explicit action to dismiss the alert before being able to continue with the activities on the device. Operations are suspended for applications rendering content on the device display (e.g., a touch screen), user inputs are disabled, and the display may be blurred, dimmed, obscured, or otherwise deactivated. The pedestrian alert system can take a snapshot of application state prior to suspension so that the applications can gracefully resume operations without disruption once the alert is manually or automatically dismissed.

18 Claims, 18 Drawing Sheets

(51) Int. Cl.
*G06F 3/0481* (2013.01)
*G06F 3/16* (2006.01)
*G06F 3/0488* (2013.01)

(56) References Cited

U.S. PATENT DOCUMENTS

| | | | |
|---|---|---|---|
| 8,384,562 B2 | 2/2013 | Wall et al. | |
| 9,153,128 B2 | 10/2015 | Holzwanger et al. | |
| 9,217,648 B2 | 12/2015 | Huck et al. | |
| 9,286,794 B2 | 3/2016 | Duncan et al. | |
| 2014/0201767 A1* | 7/2014 | Seiden | H04N 21/44218 725/12 |
| 2015/0109149 A1* | 4/2015 | Duncan | G08G 1/005 340/944 |
| 2017/0097857 A1* | 4/2017 | Yang | G06F 9/542 |

OTHER PUBLICATIONS

Jeng, Andy, "IRoadSafe—Pedestrian Safety Warning Wearable System", Published on: Jun. 30, 2015 Available at: http://contest.techbriefs.com/2015/entries/automotive-transportation/6001 (5 pages total).

Foxx, Anthony, "Protecting Pedestrians with Connected Vehicle Technology", Retrieved on: Jul. 19, 2016 Available at: https://www.transportation.gov/fastlane/protecting-pedestrians-connected-vehicle-technology (4 pages total).

Bhargava, et al., "A Mobile-Cloud Pedestrian Crossing Guide for the Blind", In Proceedings of International Conference on Advances in Computing & Communication, Jul. 22, 2011, (5 pages total).

Wang, et al., "WalkSafe: A Pedestrian Safety App for Mobile Phone Users Who Walk and Talk While Crossing Roads", In Proceedings of the Twelfth Workshop on Mobile Computing Systems & Applications, Feb. 28, 2012, (6 pages total).

* cited by examiner

PEDESTRIAN ALERTS FOR MOBILE DEVICES

BACKGROUND

Smartphones, tablet computers, wearable computing devices, and other mobile devices are commonly used both as communications devices for making phone calls and sending messages, and as platforms supporting applications that enable a wide variety of user experiences.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A pedestrian alert system supported on a mobile device such as a smartphone, tablet computer, or a wearable computing device which is employed by a user to engage in various activities, is configured to provide visual, auditory, or haptic alerts when the system uses location sensing and map data to determine the user's proximity to a pedestrian street crossing. The alert attracts the user's attention by having the user perform an explicit action to dismiss the alert before being able to continue with the activities on the device. Operations are suspended for applications rendering content on the device display (e.g., a touch screen), user inputs are disabled, and the display may be blurred, dimmed, obscured, or otherwise deactivated. The pedestrian alert system can take a snapshot of application state prior to suspension so that the applications can gracefully resume operations without disruption once the user manually dismisses the alert or when the system detects that the user has finished traversing the pedestrian street crossing and then automatically dismiss the alert. For example, the state of a game application can be persisted over the duration of suspension so that the user can pick up the game where she left off once the alert is manually or automatically dismissed and the suspension is lifted.

The pedestrian alert system enables the mobile device to function as a safety warning device with the effect of preventing accidents and enhancing safety at pedestrian street crossings by increasing the user's awareness of surroundings. The system can use different types of alerts to help break the user's fixation on the mobile device depending on applicable context, past user behaviors, user preferences, and the user's profile (e.g., whether a child, adult, differently-abled, etc.). For example, the alerts can be more attention-getting with longer advance warning for pedestrian street crossings which the system determines have high volumes of vehicular traffic at that time, or are known to have high rates of pedestrian accidents.

If the pedestrian alert system determines from device sensor data that the mobile device is in the user's pocket and the user is listening to a music application through an audio endpoint (e.g., headphones, wireless earbuds, etc.), then the system will render the alert in audio form through the audio endpoint while lowering the volume of the music application. If the user has a profile that indicates she is a child, then the alert may be configured to be non-dismissable manually by the user, and the applications will only resume with the display screen restored to an active state when the system determines that the user has finished crossing the street, or upon the elapse of a predetermined time period.

While the pedestrian alert system is configured to break the user's focus and concentration on the mobile device to warn of potential hazards, the persistence of application state after an alert is dismissed means that the user does not lose any data or miss any part of a user experience. The user may thus be more inclined to utilize the pedestrian alert system and receive the safety benefits it provides, and not disable its features or uninstall it from the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DETAILED DESCRIPTION

Figure 1:
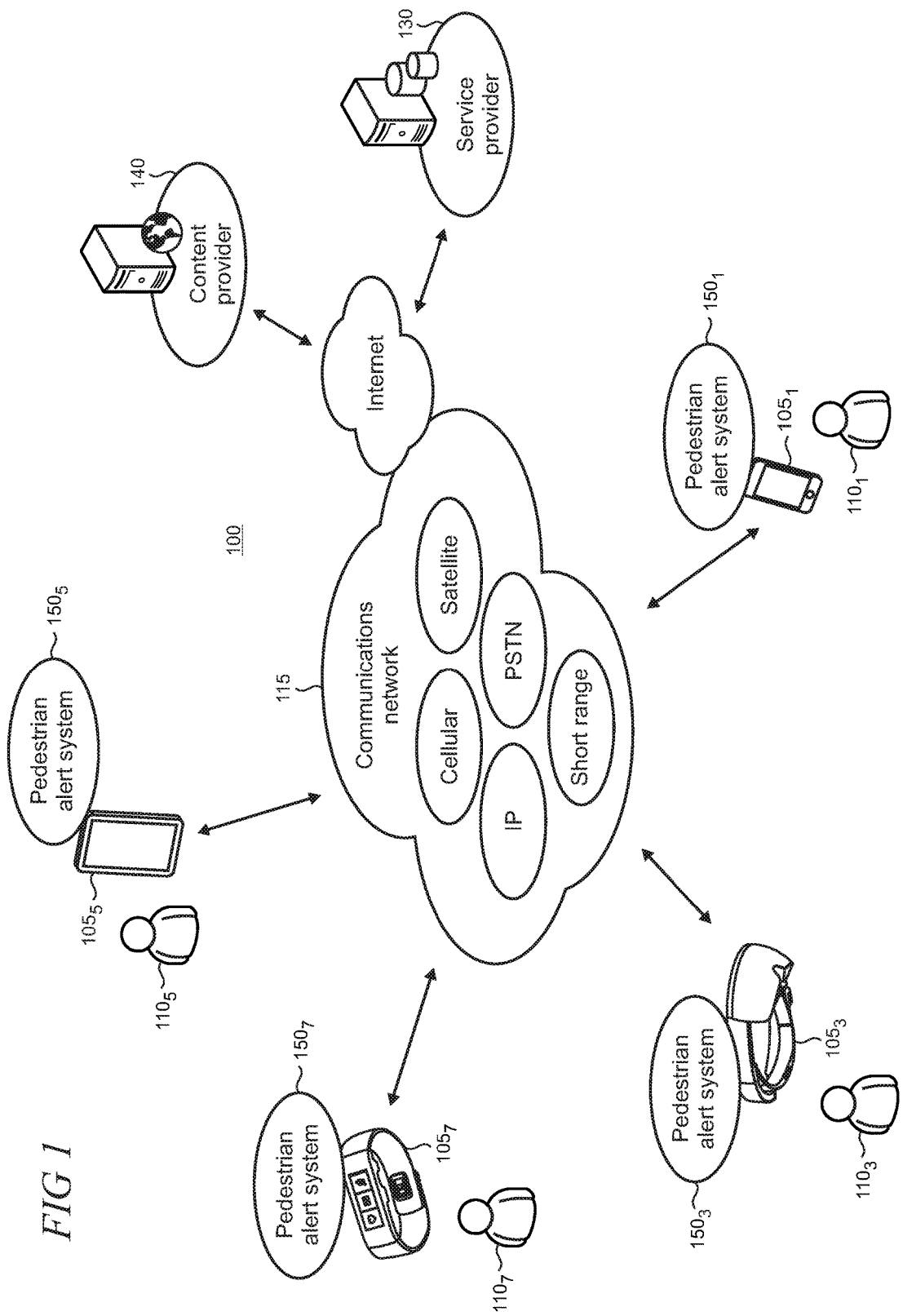
FIG. 1 shows an illustrative environment in which devices configured to support the pedestrian alert system interact over a network.

People often want to multi-task so that various tasks can be performed at the same time when using mobile devices such as smartphones, wearable computing devices (e.g., smartwatches, head-mounted display (HMD) devices, and the like), laptop computers, or tablet computers. For example, mobile device users can consume content on-the-go, communicate by voice, text, and video with other users while walking, listen to music when jogging, and watch videos, engage in social media, browse the Internet, or play games when travelling as a passenger in a car, bus, train, plane, etc.

A user performing an activity with a mobile device may tend to become so immersed that the user's attention may be completely focused on the device to the exclusion of the surrounding environment. The user may not pay full attention when crossing a street and fail to notice obstacles or oncoming vehicles which can result in accidents and injuries. For example, new releases of popular games or other mobile content are often followed by reports of users being so absorbed and involved with the new content that accidents occur between the users and vehicular traffic. The present pedestrian alert system enables the mobile device to operate as safety equipment with the effect of redirecting the user's attention to her physical surroundings and away from the device to increase awareness and enhance safety when crossing streets.

In various illustrative examples, the pedestrian alert system may run on a mobile device as a background process and use data obtained from a mobile device sensor, such as an accelerometer or heartrate monitor, to determine when the user is engaged in some form of pedestrian locomotion (e.g., walking, jogging, running, using a wheelchair, etc.). The pedestrian alert system tracks the user's location with respect to a pedestrian street crossing using data from location and/or position sensors such as a GPS sensor (or other sensor supporting location-awareness) and map data from a map application and/or service.

The pedestrian alert system generates an alert as the user approaches a pedestrian street crossing. A given alert can vary in configuration depending on a history of user behavior when interacting with the system, user profile, settings, preferences, and applicable context (e.g., characteristics of the crossing, traffic volume, time of day, etc.) For example, the alert may include a graphic window with a message indicating that the user is approaching a pedestrian street crossing. In some implementations, the alert can instruct the user to look up (i.e., adopt a "heads up" pose) using a visual or audible message so that the user can become aware of her surroundings. A counter that shows the approximate time or a countdown until the user reaches the pedestrian street crossing may also be included with the alert to give the user advance warning or notice and time to prepare for suspension of activities on the mobile device as described below.

The pedestrian alert system may utilize a gaze sensor or front-facing camera to determine whether the user is looking at the device display (e.g., a touch screen). If so, then the applications which are rendering content into graphical user interfaces (GUIs) on the display screen are identified so that the content rendering may be temporarily suspended and application state frozen. When the user reaches the pedestrian street crossing, the counter typically counts down to zero and the application GUIs on the display screen become inactive and user inputs to those applications are disabled. For example, the display screen can be de-activated by blurring, freezing, dimming, or obscuring the application GUIs and user input to the touch screen can be ignored.

Applications running in the foreground and background on the mobile device may be configured to respond differently when the user reaches the pedestrian street crossing. Foreground applications that have focus (i.e., are actively rendering into a GUI and/or consuming user inputs) can be frozen to preserve application state as the alert is displayed, while background processes such as downloads and audio rendering (e.g., music playback) may continue to be executed without interruption. In some cases, graphic content associated with the background processes such as download status (e.g., percent complete) and the like may be suspended even though the background processes themselves continue as the alert is displayed. For state-sensitive applications such as games and other dynamic applications, application state is saved and the GUI of the game is de-activated when the user reaches the pedestrian street crossing so that the user is no longer able to interact with the application.

The alert may expose user controls on the device such as virtual or physical buttons, or other suitable devices, that are configured to enable the user to manually close the window and/or dismiss the alert. In some implementations, the alert dismissal may only be effectuated once the system has determined that the user has looked up from the display screen and has thus assumed a "heads up" position to observe her surroundings. The application operations and GUI rendering may be resumed upon dismissal so that the user can continue with her activities using the mobile device.

In other cases, an alert does not expose user controls for manual dismissal and the alert remains active so that GUI applications are suspended and the alert continues to be shown on the display screen as the user traverses the pedestrian street crossing, or for a predetermined time interval. When the alert is dismissed either manually or automatically, the applications having saved state can smoothly resume as if the interruption due to the alert did not happen. For example, a game which the user was playing can resume from the same place at which it was interrupted by the alert, or a video clip can start from the last point the user was watching. In some implementations, a counter can be displayed to give the user advance notice of the resumption of application activities.

The pedestrian alert system can set alert attributes such as the presence or absence of user controls based on the information associated with the pedestrian street crossing and/or other context. For example, the pedestrian alert system on a local mobile device may communicate with a remote server associated with a service provider that transmits data for a type of alert to be raised for a given pedestrian street crossing. The remote server may host or be coupled to a location database that stores characteristics and context associated with a given pedestrian street crossing such as the accident rate, vehicular traffic patterns, presence of traffic signals, number of traffic lanes, traffic speed limit, or distance of the nearest traffic signal from the pedestrian street crossing. Contextual data that indicates the setting or environment of the crossing (e.g., in a park, at a busy downtown intersection, in a corporate park, etc.), or the busiest times of day, busiest times of year, and the like may also be stored in the location database or be stored in another database that is accessible by the system.

Using the pedestrian street crossing information, the remote server may cause the mobile device to configure the alert with or without user controls for dismissing an alert, tailor other attributes associated with an alert, or set the alert to have particular behaviors or characteristics. For example, an alert that is raised when the user is approaching a pedestrian crossing of a noisy city street having a high vehicle speed limit at rush hour with no pedestrian signaling may be configured differently from an alert for a pedestrian crossing in a corporate park or campus setting in which vehicle traffic is less dense and moves more slowly. In the former case, the alert may be configured with highest impact to catch the user's attention while in the latter case the alert may be more subdued. This variation of the alert impact in accordance with the user's perception of risk may help to increase acceptance of the pedestrian alert system and encourage its use.

The remote server can compare the accident rate at the traffic signal with a predetermined threshold accident rate and tailor the alert to a particular crossing. For example, the predetermined threshold accident rate can include the average or median accident rate for a set of the pedestrian street crossings in a city/town of equivalent size. If the accident rate is higher than the threshold accident rate which indicates that the pedestrian street crossing may be particularly hazardous, then the mobile device configures the alert to be automatically dismissed only when the system determines that the user has traversed the pedestrian street crossing, or upon expiration of a predetermined time period. The predetermined time period for automatic dismissal of the alert may be dynamically set, for example, based on the user's walking speed or the distance the user needs to travel to cross the street. If the accident rate is lower than the predetermined threshold accident rate, the remote server may cause the mobile device to configure the alert with user controls to enable dismissal of the alert.

The alert configuration can also depend on the profile of the user in addition to the characteristics of the pedestrian street crossing. For example, if the user profile is associated with a child, then the alert can be configured to not expose the manual dismissal user control so that the user cannot manually dismiss the alert and resume activities. Instead, the alerts may always be configured for automatic dismissal by the system upon determining that the user finished crossing the street, or upon expiration of a predetermined time period. For an adult profile, the alert may be configured with the user controls for manual dismissal, or enable manual dismissal except, for example, in cases where the system determines that a pedestrian street crossing is particularly hazardous.

With notice to the user and user consent, the pedestrian alert system can track user behaviors when dealing with alerts to create a history, and then configure alerts responsively to the history. For example, if the history indicates a tendency for the user to employ the controls to manually dismiss the alerts, then future alerts may be configured to always include user controls. If the user tends not to dismiss the alert manually, then the alert can be configured without the user controls, or include the controls only in situations where the user has used them in past (e.g., either for the same pedestrian street crossing or for crossings that have similar characteristics). Such tailoring of the alerts to match past user behaviors may help to increase the usage of the pedestrian alert system by users as the alerts appear to be helpful in increasing user awareness and safety, are convenient to deal with by being appropriately configured in contextually-relevant manner, and are not intrusive (i.e., alerts behave as the user expects them to behave).

The pedestrian alert system can also expose a user interface to create a user profile on the mobile device and set various attributes of the alerts that are generated and/or for selecting preferences for pedestrian alert behaviors and characteristics. For example, the user may set preferences to enable visual warnings only, audio warnings only, haptic warnings only, or to preferred combinations of visual, haptic, and audio warnings for given alert scenarios. User preferences can also be set to enable the system to reduce audio endpoint volume for music and other audio content during pendency of alerts, and control how the display screen is disabled (e.g., whether, dimmed, frozen, or obscured, etc.), and whether or not to include user controls in the alerts. In addition, other attributes of the alerts such as intensity of the alerts, frequency of the alerts, or duration of the alerts can be tailored to the user profile so that a child profile may have more frequent and longer warnings as compared to an adult profile.

Advantageously, the pedestrian alert system serves to alert the user when the user approaches a pedestrian street crossing and, based on the characteristics of the pedestrian street crossing, may set the attributes of the alert. As the alert can be dismissed with user input if so desired, the alert draws the user's attention to the pedestrian street crossing she is approaching without significantly interrupting the user experience on the mobile device. Moreover, as the background applications are not affected and as the state of some applications may be persisted, the inconvenience to the user to restart a background process, application, user experience, or other content is mitigated. Configuring the alert for automatic dismissal may further enhance the safety benefits of the pedestrian alert system as it discourages the user from intently focusing her attention at the mobile device and encourages the user to take a heads up attitude and look at the surroundings when crossing a street.

Turning now to the drawings, FIG. 1 shows an illustrative environment 100 in which users 110 employ devices 105 that communicate over a communications network 115. The users can be the same person in some cases (i.e., a user can use more than one device). The devices typically provide voice telephony capabilities and support data-consuming applications such as Internet browsing and multimedia (e.g., music, video, etc.) consumption in addition to various other features. The devices may include, for example, mobile user equipment, such as cell phones, tablet computers, and smartphones which users often employ to make and receive voice and/or multimedia (i.e., video) calls, engage in messaging (e.g., texting) and email communications, use applications and access services that employ data, browse the World Wide Web, and the like.

Alternative types of electronic devices may also be usable within the communications environment 100 so long as they are configured with communication capabilities and can connect to the network 115. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computers, navigation devices such as GPS systems, gaming systems, or the like. In the discussion that follows, the use of the term "device" is intended to cover all devices that are configured with communication capabilities and are capable of connectivity to the network 115.

The various devices 105 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices can vary by implementation. For example, some devices can support touch controls, gesture recognition, and voice commands, while others may enable a more limited user interface. Some devices may support video consumption and Internet browsing, while other devices may support more limited media handling and network interface features.

As shown, the devices 105 can access the communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth networks. The network infrastructure can be supported, for example, by mobile operators, enterprises, Internet service providers (ISPs), telephone service providers, data service providers, and the like. The communications network 115 typically includes interfaces that support a connection to the Internet so that the mobile devices 105 can access content provided by one or more content providers 140 and access a service provider 130 in some cases. Accordingly, the communications network 115 is typically enabled to support various types of device-to-device communications including over-the-top communications, and communications that do not utilize conventional telephone numbers in order to provide connectivity between parties. The devices and communications network may be configured to enable device-to-device communication.

The devices 105 can execute one or more applications for various purposes. These may include without limitation, navigational applications, applications that deliver text, audio or video content, and file sharing and messaging applications. In an illustrative example, the devices 105 are configured with a pedestrian alert system 150 that may be implemented as a component or feature of or one or more applications, be implemented in whole or part with a remote service, or be incorporated into an operating system on a device as discussed in more detail below. The pedestrian alert system is configured to detect when users are engaged in some form of self-locomotion (e.g., walking, jogging, running) while looking at the display on their respective devices.

Upon detecting that a user's attention is not on her surroundings, the device 105 suspends the execution of applications or programs that are rendering content onto the device display that is viewed by the user 110. The device instead shows an alert in a window to warn that the user is approaching a pedestrian street crossing. A pedestrian street crossing, as the term is used herein, is an area that is recognized by pedestrians and vehicle drivers as a designated area for crossing a street. The pedestrian street crossing may have a pedestrian "walk" signal and may be marked with lines and/or stripes (e.g., "zebra" stripes). The alert works to draw the user's attention away from the display screen and towards that crossing and surrounding environment so that she may navigate the pedestrian street crossing safely with her complete attention.

Figure 2:
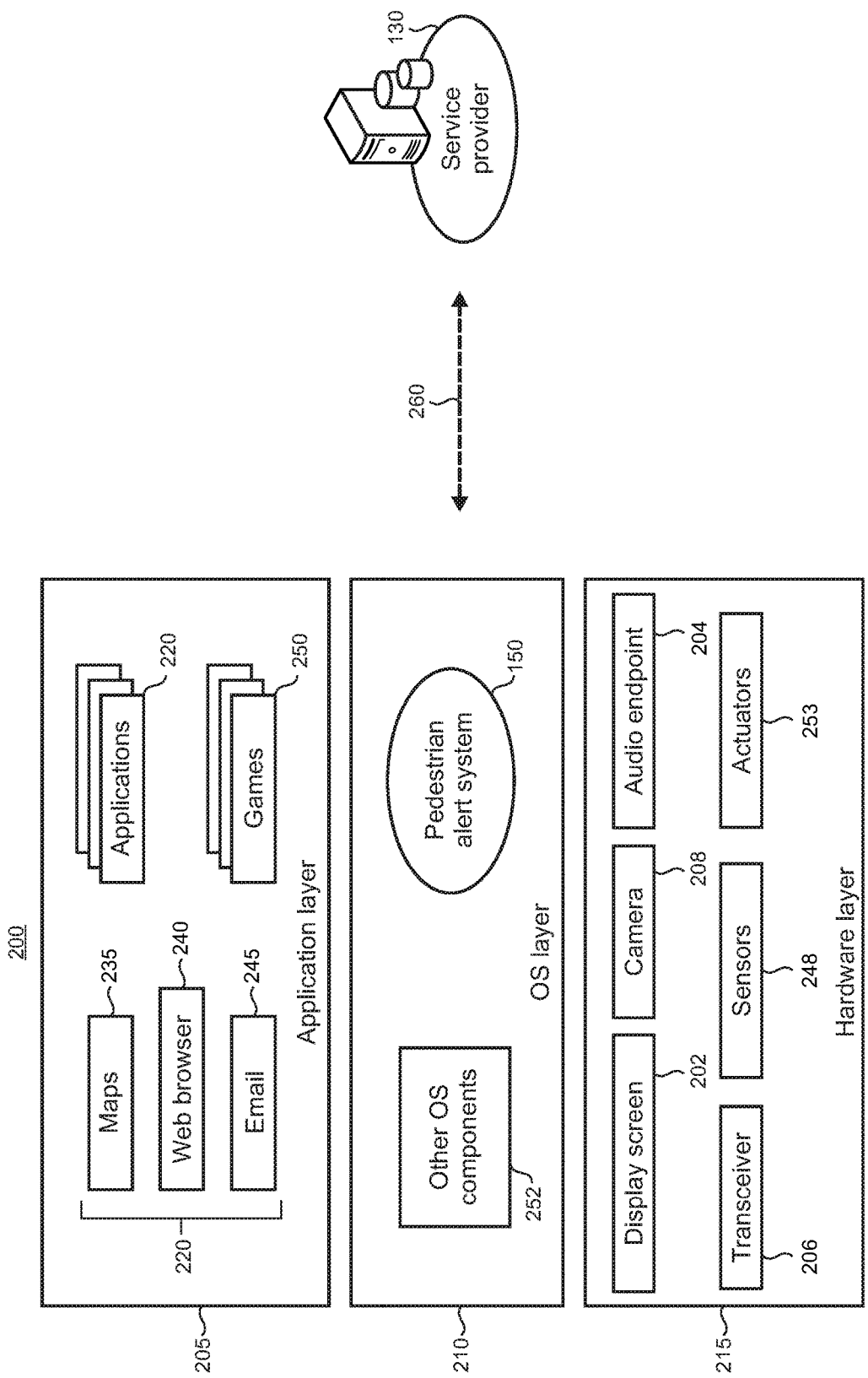
FIG. 2 shows an illustrative layered architecture that includes a pedestrian alert system.

FIG. 2 shows an illustrative layered architecture 200 that may be instantiated on the devices 105 that supports the applications. The architecture is typically implemented in software, although combinations of software, firmware, and/or hardware may also be utilized in some cases. The architecture 200 is arranged in layers and includes an application layer 205, an OS (operating system) layer 210, and a hardware layer 215. The hardware layer 215 provides an abstraction of the various hardware used by the device 105 (e.g., input and output devices, networking and radio hardware, etc.) to the layers above it. In this illustrative example, the hardware layer 215 may support a display screen 202 (which may be touch-sensitive in some implementations); audio endpoints 204 such as speakers, earbuds, wireless headset, or the like and a microphone; communication and location-sensing and/or position-sensing hardware such as GPS (Global Positioning System), accelerometers, gyroscopes, Wi-Fi, cellular transceivers 206; optical hardware and sensors such as camera 208; sensors 248; haptic actuators 253, and the like.

The application layer 205 in this illustrative example supports various applications 220 such as a web browser 240, maps 235, email 245, games 250, and the like. The applications are often implemented using locally executing code. However, in some cases, applications may rely on services and/or remote code execution provided by remote servers or other computing platforms such as those supported by the service provider 130 or other cloud-based resources. While the applications 220 are shown here as components that are instantiated in the application layer 205, it will be appreciated that the functionality provided by a given app may be implemented, in whole or part, using components that are supported in either the OS layer 210 or hardware layer 215.

As shown in this illustrative example, the OS layer 210 supports the pedestrian alert system 150 and various other OS components 252. In some cases, the pedestrian alert system 150 can interact with the service provider 130, as indicated by line 260, for example, to retrieve data that is associated with a pedestrian street crossing with which, at least in part, a pedestrian alert may be configured. The pedestrian alert system, in some implementations, can partially utilize or fully utilize remote code execution supported at the service provider, or using other remote resources. In addition, it may utilize and/or interact with the other OS components (and/or other components that are instantiated in the other layers of the architecture 200) as may be needed to implement the various features and functions described herein. While the pedestrian alert system 150 is shown in this illustrative example as being instantiated in the OS layer 210, it will be appreciated that the functionality provided by the pedestrian alert system may be implemented, in whole or part, using components that are supported in either the application or hardware layer.

Figure 3:
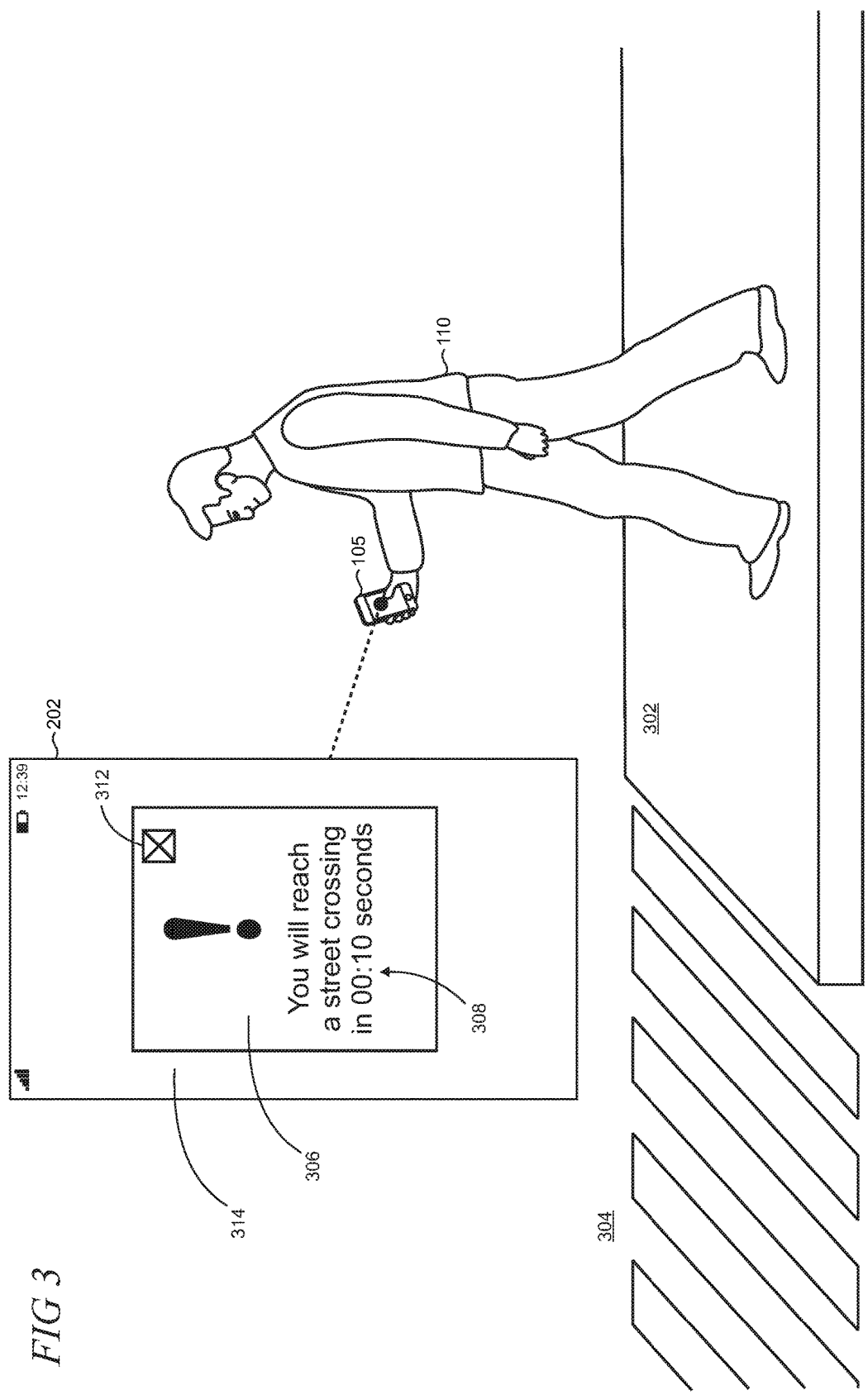
FIGS. 3 and 4 show illustrative use scenarios for the pedestrian alert system.

FIG. 3 shows illustrative operations of the pedestrian alert system 150 on a mobile device 105. A user 110 walking on a pedestrian path or sidewalk 302 employs the mobile device 105 for activities that direct the user's attention on the display screen 202. Such activities may include, for example, playing a game, texting, consuming text or video content, conducting administrative activities for the mobile device including initiating downloads of applications or updates, adjusting settings, and the like. Activities as executed by applications can produce GUIs (Graphical User Interfaces) 314 which direct the user's attention to the display screen.

As the user's attention is on the display screen, rather than the sidewalk, the user may not be aware of the pedestrian street crossing 304 that he is approaching. This can lead to dangerous situations or accidents due to oncoming vehicles in the pedestrian street crossing, other pedestrians, or obstacles (e.g., strollers, bicycles, and the like). Some pedestrian street crossings may have pedestrian signs or "walk" signals while others may not have any signals. The pedestrian alert system 150 can identify situations in which the user 110 approaches the pedestrian street crossing 304 while looking at the display screen 202 and responsively provide an alert 306 to the user in a conspicuous or prominent manner. This draws the user's attention away from the mobile device to the sidewalk so that the user may observe the traffic signals and safely traverse the pedestrian street crossing. When displaying the alert, the pedestrian alert system may disable, dim, freeze, or occlude at least portions of the GUI that were holding the user's attention.

In an illustrative implementation, the pedestrian alert system 150 tracks the user's location and is able to determine that the user 110 is approaching the pedestrian street crossing 304. Such tracking is typically performed with notice to the user and the user's consent. The user's location can be tracked for example, utilizing the location components such as a GPS (Global Positioning System) or other location-aware component supported on the mobile device 105 which may operate with a map application or map service. By mapping the user's GPS coordinates, obtaining the user's current rate and direction of travel, the pedestrian alert system can determine that the user is approaching the pedestrian street crossing 304.

The pedestrian alert system 150 may be enabled to use the display screen 202 or to employ optical sensors such as a camera 208 to determine that the user 110 is looking at the display screen 202. Applications that are actively rendering content on a substantial portion of the display screen can be identified and presumed to be drawing the user's attention and view in some cases. In addition, the position of the user's head relative to the user device or the display screen can be determined using the camera to identify whether the user is looking at the display screen. Gaze detection, face identification, and/or recognition techniques can also be applied to images captured by the optical sensors or camera to determine the direction of the user's view.

In response to the determination that the user is approaching the pedestrian street crossing while looking at the display screen, the pedestrian alert system may provide an alert to the user that is rendered by the device. In an illustrative example, the system launches the alert 306 before the user 110 reaches the start of the pedestrian street crossing 304. The alert 306 may be launched at some predetermined time interval prior to the user's estimated arrival at the pedestrian street crossing. In some implementations, the countdown can be performed without being expressed in units of time (e.g., seconds). The alert may also be provided when the user is located at some predetermined distance from the pedestrian street crossing.

The alert 306 may comprise a window, or an overlay on a portion of the GUI or content 314, that is being viewed by the user 110 as he nears the pedestrian street crossing 304. The alert can also include a text message 316 or other graphical content or animations and a counter 308 that shows a countdown until the user 110 is estimated to reach the pedestrian street crossing 304. The alert 306 may be accompanied by an audio alert generated by the auditory components of the mobile device 105 and/or a haptic alert generated by actuators disposed in the mobile device 105.

The user 110 can continue to interact with the GUI 314 shown on the display screen 202 during the countdown in some implementations. Alternatively, portions of the display screen may be disabled when the alert appears so that the user is not able to interact with the application GUIs. The alert can further include user controls such as a close control 312 that allows the user to dismiss the alert and continue with the activity on the mobile device 105. The close control is an illustrative example and other methodologies for dismissing alerts or notifications such as the inclusion of an "OK", "Dismiss," or a "Cancel" button on the alert can be used. Voice commands may also be utilized as user controls to dismiss an alert in some implementations. Gestures performed by the user may also be utilized as user controls and sensed by components on the mobile device to effectuate alert dismissals in other implementations.

The alert 306 may be configured to be non-dismissable by the user 110 in which case no user controls are included in the alert. However, the pedestrian alert system may automatically dismiss the alert either upon the user completing traversal of the pedestrian street crossing or upon expiration of a predetermined time period, for example, whichever may occur first. The predetermined time period for the automatic dismissal of the alert may be variable and set dynamically based on the speed at which the user is walking and the distance the user has to walk in order to completely traverse the pedestrian street crossing 304. As the user nears the pedestrian street crossing, the counter 308 may show a countdown until an estimated time of arrival at the crossing, at which time the counter typically reads zero.

Figure 4:
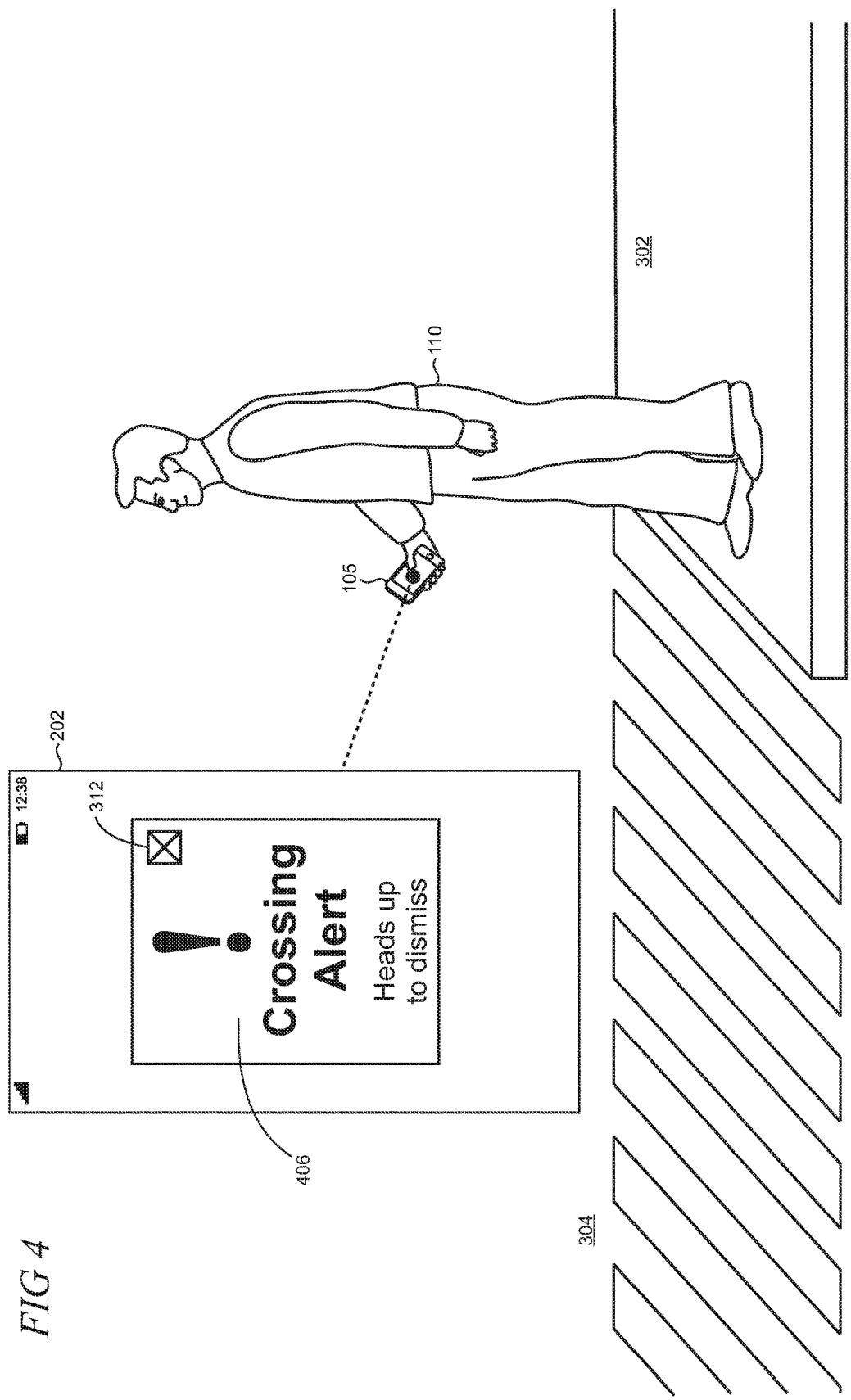

FIG. 4 shows illustrative operations of the pedestrian alert system 150 when the user 110 is at the pedestrian street crossing 304. In this example, the alert dismissal may only be effectuated once the system has determined that the user has looked up from the display screen and thus an alert 406 advises the user to assume a "heads up" position to observe his surroundings before the alert is dismissed. In some cases, the user may need to both look up and interact with the close control 312. Until the alert is dismissed, the GUI shown on the display screen may be frozen, dimmed, obscured, or otherwise disabled so that the user 110 can no longer interact with the GUI, and operations of applications rendering into the GUI can be suspended.

The pedestrian alert system 150 may identify a current state for state-sensitive applications such as the gaming application 250 and persist the state through the time period that the application is frozen and the GUI 314 is disabled. Background tasks such as receiving/transmitting data, location tracking, and the like are excluded from suspension so that they can continue without interruption. When the alert 306 is dismissed either automatically or manually by the user 110, the GUI 314 becomes active and the state is resumed from the persisted state so that the user can continue the application where he left off without losing his place or missing any context within the application user experience. As shown, the message 316 may be updated to inform the user 110 that he has reached the pedestrian street crossing 304.

Figure 5:
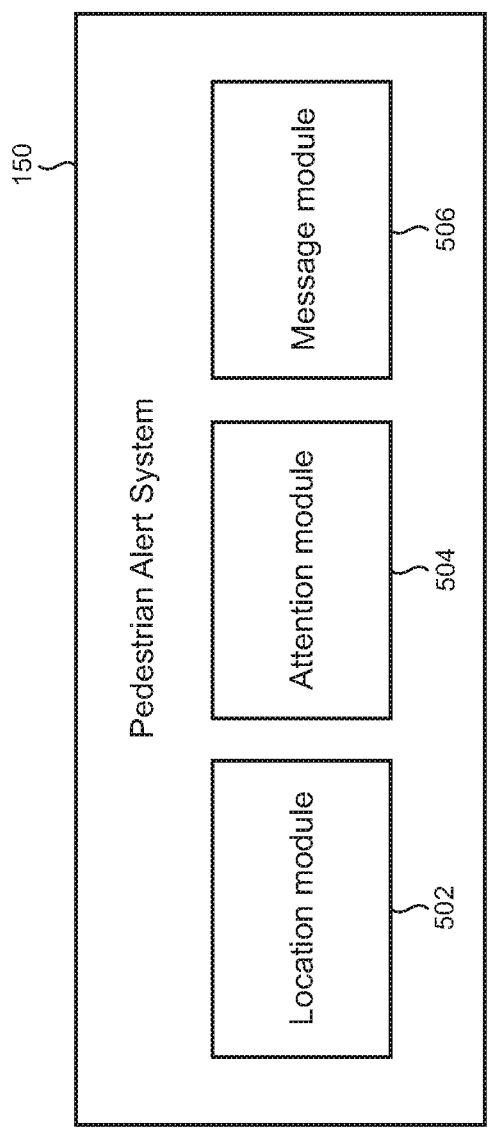
FIG. 5 is a block diagram that shows illustrative modules that may be used to implement the pedestrian alert system.

FIG. 5 is a block diagram that shows illustrative modules that may be used to implement the pedestrian alert system 150. The pedestrian alert system can be implemented, for example, using processor-readable instructions read from a hardware-based (i.e., non-transitory) storage device in the mobile device 105. Motion sensor data provided by accelerometers or gyroscopes of the mobile device may be monitored by a location module 502 in order to determine when the mobile device is in motion. When in motion, the location module 502 may employ location sensors of the mobile device 105 such as GPS sensors to identify the location of the mobile device 105. For example, the location of the mobile device may be obtained by identifying the GPS coordinates on a mapping application 235.

The location module 502 may also determine the speed of the user 110 using the motion sensor data. The mobile device 105 can identify a current location where the user is walking using the information from the mapping application. The location of a next pedestrian street crossing 304 that will be encountered by the user 110 is identified. The location module 502 further calculates the distance of the user from the pedestrian street crossing using the current location. Based on the user's distance from the pedestrian street crossing and the user's speed, the time until the user will reach the pedestrian street crossing may be determined.

When the location module 502 determines that the user 110 is walking on the street, a signal is transmitted from the location module 502 to an attention module 504 for determining if the user's attention is focused on the display screen 202. Various methods including those that employ optical components such as the camera 208 may be used to determine whether the user's attention is on the display screen 202. For example, the pedestrian alert system 150 may infer that the user is viewing the display screen based on factors such as whether the display screen 202 is on, and applications such as games 250, email 245, or web browser 240, chat applications and the like are rendering content on the display and/or receiving user input. Alternatively, face recognition techniques applied to images captured by the front facing camera may be utilized to determine if the user is looking at the display screen.

One or more of a plurality of applications that are actively rendering content to the display screen 202 may be identified by the system so that their operations may be temporarily suspended. Furthermore, the system may determine whether any of the applications are state-sensitive so that the states can be preserved thus allowing the user 110 to resume interaction with the applications after the alert 306 is dismissed. The background applications such as location detection which do not produce any visual output are allowed to continue operations.

The outputs from the location module 502 and the attention module 504 are received by a message module 506. When it is determined that the user 110 is moving and that the user is looking at the display screen 202, the message module 506 transmits the alert 306. The alert can include information from the location module 502 in that the alert may include a counter 308 which shows a countdown until the user 110 reaches the pedestrian street crossing 304. For example, the distance from the pedestrian street crossing 304 at which the counter 308 is started or at which the alert appears may vary depending on the user profile. Accordingly, if the user 110 is a child, the counter may begin earlier so that the alert provides more advance warning as compared to an alert that is associated with an adult profile.

The message module 506 can configure the alert 306 according to various functional attributes including alert type, and amount of advance warning, and design attributes such as size, background transparency, icon and/or other graphics to include in the message, and the like. These attributes may be set automatically or manually by a user 110 using, for example, user interface for selecting configuration or preferences associated with the pedestrian alert system 150. The alert can be configured to be automatically dismissed or dismissed manually through user controls such as the close control 312 or other buttons.

The message module 506 can also be further configured to record the user behavior in a user profile. For example, the user's preference to dismiss or not dismiss the alert 306 may be recorded and subsequent alerts may be generated in accordance with the user's preferences. So if the user 110 promptly dismisses the alert, then subsequent alerts can be configured to include the user controls. Conversely, if the user does not promptly dismiss the alert, subsequent alerts without the user controls can be generated. The attributes of the alerts can depend on other aspects of the user profile such as whether the user has an adult or a child profile. For younger users, the alerts can be configured without the user controls. One or more of audible or haptic alerts can also be included with the visual alert based on the user profile in other cases.

Figure 6:
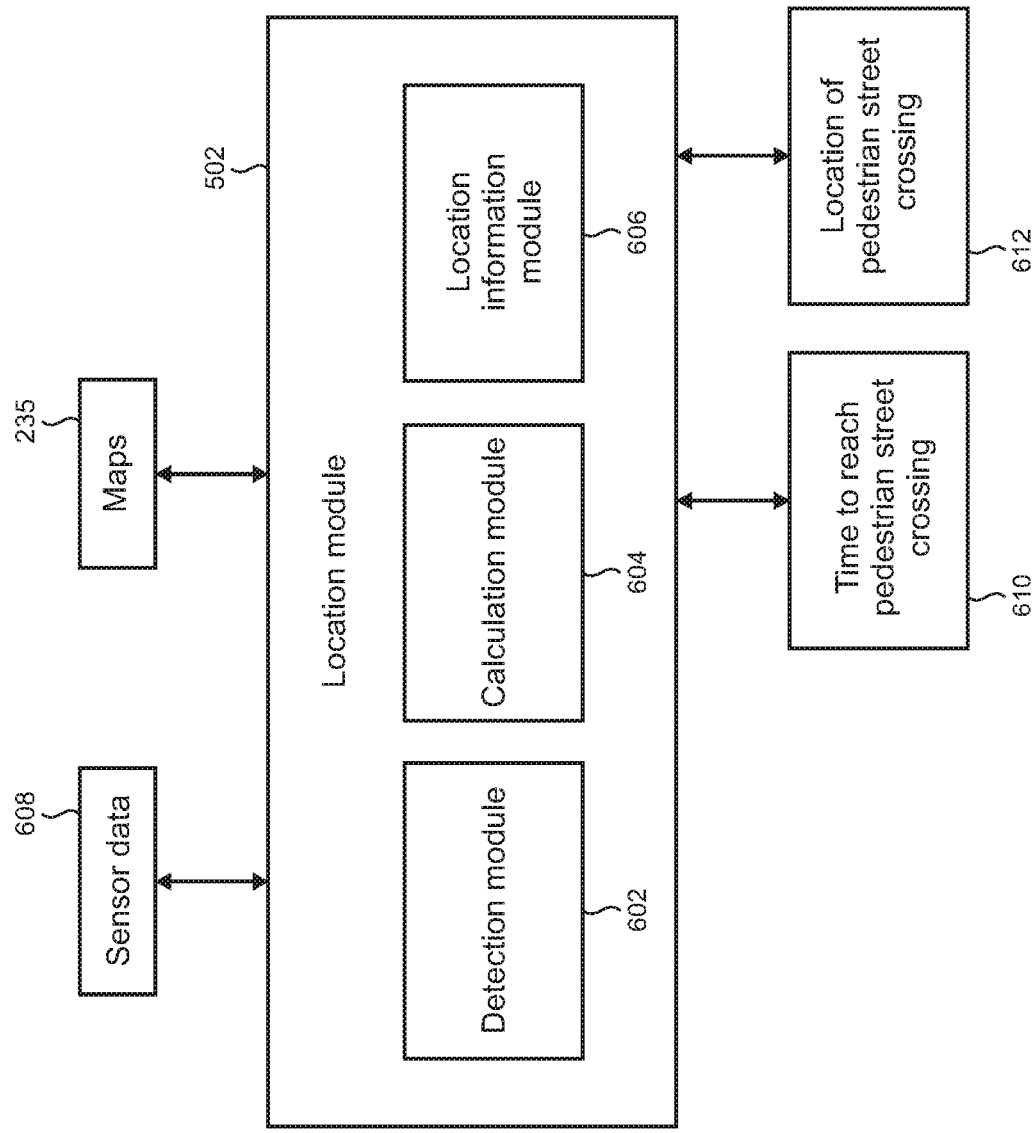
FIG. 6 is a block diagram that shows an illustrative example of a location module that may be utilized in the pedestrian alert system.

FIG. 6 is a block diagram showing an example of the location module 502. The location module 502 detects that the user 110 is moving along a street, identifies the next pedestrian street crossing that will be encountered by the user, and obtains various attributes such as the speed of the user and the distance to be traveled by the user, and determines the time until the user reaches the identified pedestrian street crossing. Various components such as the GPS sensors, motion sensor data, and mapping applications may be employed by the location module 502.

A detection module 602 receives sensor data 608 from the various motion sensors such as accelerometers and gyroscopes of the mobile device 105 to detect that the user 110 is walking, and to obtain the direction and speed of the user. The sensor data 608 is received by a calculation module 604 to obtain various attributes of the user's motion. For example, based on the distance covered by the user within a given time, the calculation module 604 may determine the speed of the user's locomotion.

The location module 502 receives outputs from the detection module 602 and the calculation module 604 to identify the location of the user 110. The location module 502 may further obtain the user's GPS coordinates from the sensor data 608 and correlate the GPS coordinates with information from the mapping application 235 to obtain the user's location. The location module 502 may use the speed and direction of the user's motion with information from the mapping application 235 to identify the location of the pedestrian street crossing 612 that will be next encountered by the user. The location information module 606 may also determine how much time 610 remains until the user reaches the pedestrian street crossing.

Figure 7:
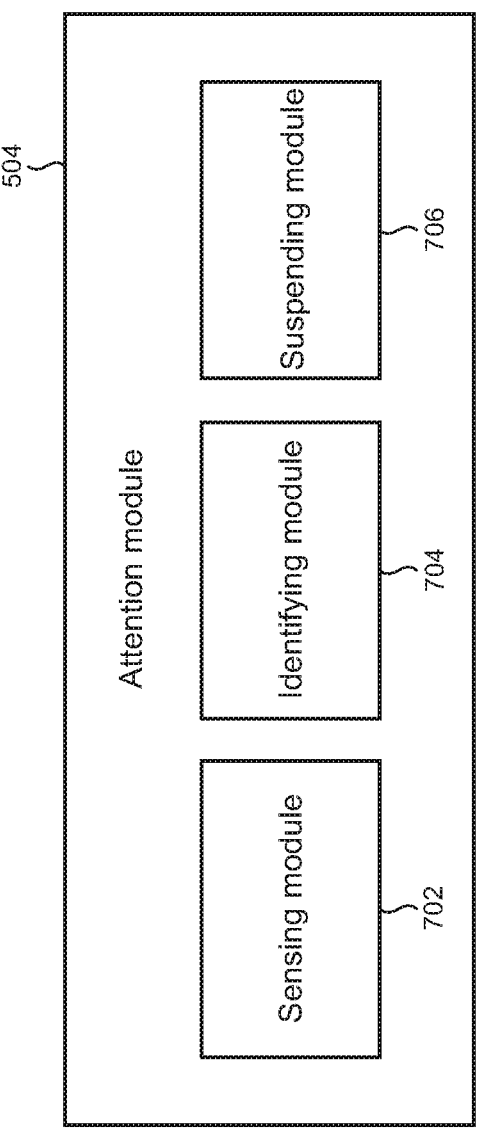
FIG. 7 is a block diagram that shows an illustrative example of an attention module the may be utilized in the pedestrian alert system.

FIG. 7 shows an illustrative example of an attention module 504 that may be configured to determine when a user 110 is looking at the mobile device 105 and suspend operations of application GUIs. When the location module 502 determines that the user is walking, the attention module 504 determines if the user is looking at the display screen 202 of the mobile device 105. A sensing module 702 is configured to sense various conditions associated with the display screen 202. Such conditions may include the display screen being on, one or more applications or processes rendering content to a significant portion of the display screen, the display screen receiving touch input, or detection of the user's face by the camera 208 can be used to determine that the user's attention is on the mobile device 105.

In identifying the one or more applications rendering content to a significant portion of the display screen 202, the attention module 504 may identify an application rendering content that occupies some minimal threshold amount, for example, 25 to 100 percent of the area of the display screen. This prevents processes like downloads that run small graphics or applications showing small icons on the display screen being identified by the attention module 504 as meeting the threshold to be considered as rendering content to the display screen.

When it is determined that the user 110 is walking with her attention on the display screen 202, an identifying module 704 proceeds to identify the foreground applications that may be executing GUIs that are actively rendering content on the display screen. The pedestrian alert system 150 therefore distinguishes between background processes or applications that do not render content for display versus applications that execute GUIs that render visible content to the display screen.

A suspending module 706 receives information regarding the applications associated with the GUIs in the foreground and proceeds to suspend operations of the foreground applications that are currently rendering content on the display screen 202. If the applications are state sensitive such as games, a snapshot of the current state may be taken and stored to enable the user to pick up the application exactly at the point where it was suspended when the alert 306 appeared. The background processes can proceed uninterruptedly during the appearance and the dismissal of the alert.

Figure 8:
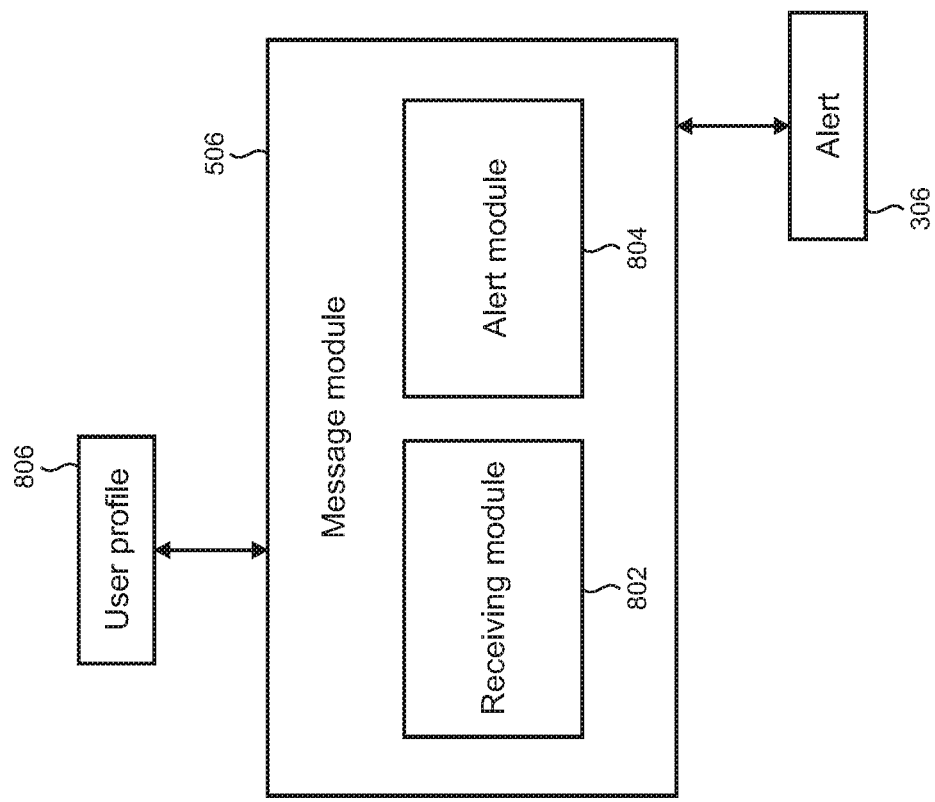
FIG. 8 is a block diagram that shows an illustrative example of a message module that may be utilized in the pedestrian alert system.

FIG. 8 is a block diagram showing illustrative details of the message module 506 that is configured to generate the alert 306. When the location module 502 and the attention module 504 determine that the user 110 is walking and that the user's attention is on the display screen 202, a signal is obtained at a receiving module 802 to generate the alert. In addition, the receiving module 802 may further receive information regarding the time until the user reaches the pedestrian street crossing 304 and regarding the user profile 806.

For example, the receiving module 802 is further configured to receive information regarding the pedestrian street crossing 304 such as the length of the crossing, whether the crossing has signals or is an un-signaled crossing, the accident rate associated with the crossing, and the like. The information regarding the pedestrian street crossing may be retrieved from a locally accessible database and transmitted by the service provider 130 or it may be forwarded from a third-party database.

Based on the received information, an alert module 804 generates the alert 306 which can comprise a message and, optionally, a counter that typically counts down from a non-zero number to zero when the user 110 reaches the pedestrian street crossing 304. The alert module 804 can further configure the alert with audio warning and/or haptic output based on the preferences which may be expressed by a user and stored in the user profile 806. In addition, the alert may be configured for automatic dismissal without exposing user controls for certain user profiles such as child user profiles. Automatic dismissal alerts (i.e., those that cannot be dismissed manually) may also be generated for certain pedestrian street crossings, for example, dangerous crossings that have particularly high accident rates, or for pedestrian street crossings that are very wide, or for those which may not have a walk signal, and the like.

Figure 9:
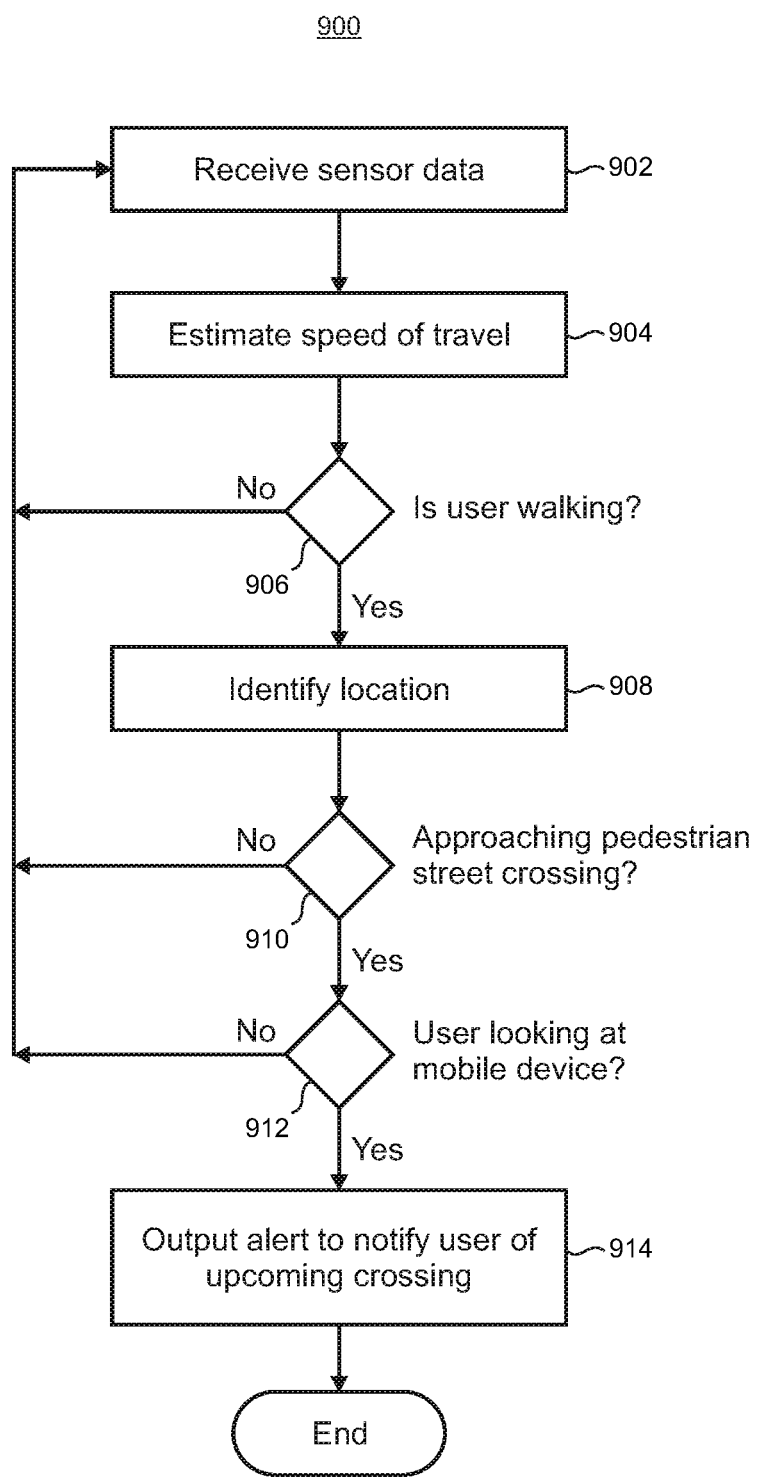
FIG. 9 is a flowchart of an illustrative method of providing alerts to a pedestrian who is using a mobile device.

FIG. 9 is a flowchart of an illustrative method 900 of providing alerts, warnings, or notifications to a user 110 employing a mobile device 105 when walking in an area that has pedestrian street crossings. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Method 900 may be executed by a processor of the mobile device 105 employed by the user 110. The method begins at step 902 with the pedestrian alert system 150 receiving sensor data 608, being data emitted by the various sensors of the mobile device 105 which may comprise GPS sensors, accelerometers, gyroscopes, or the like. At step 904, the speed of travel of the mobile device may be estimated using the sensor data 608. Based on the speed of travel obtained at 904, it is further determined at 906 if the user 110 walking. If it is determined at 906 that the user is not walking, the method returns to step 902 wherein the pedestrian alert system continues to receive the sensor data 608. If it is determined at step 906 that the user is walking (i.e., engaged in self-locomotion of some form), the user's location is identified at step 908.

The location can be determined, for example, by correlating GPS coordinates of the mobile device 105 against a map or mapping data. At step 910, it is determined if the user is proximate to a pedestrian street crossing based on the user's GPS coordinates, direction of travel, and data from the maps application 235. If there is no pedestrian street crossing in the user's path, the process returns to step 902. Otherwise, the method proceeds to step 912 where it is further determined whether the user is looking at the display screen 202 of the mobile device 105.

If it is determined that the user is not looking at the mobile device display screen, then the method again returns to step 902. Otherwise, the method proceeds to step 914 in which an alert 306 is generated to warn the user of the upcoming pedestrian street crossing. The alert can be configured based on one or more of the attributes of the pedestrian street crossing or a profile associated with the user as described above.

Figure 10:
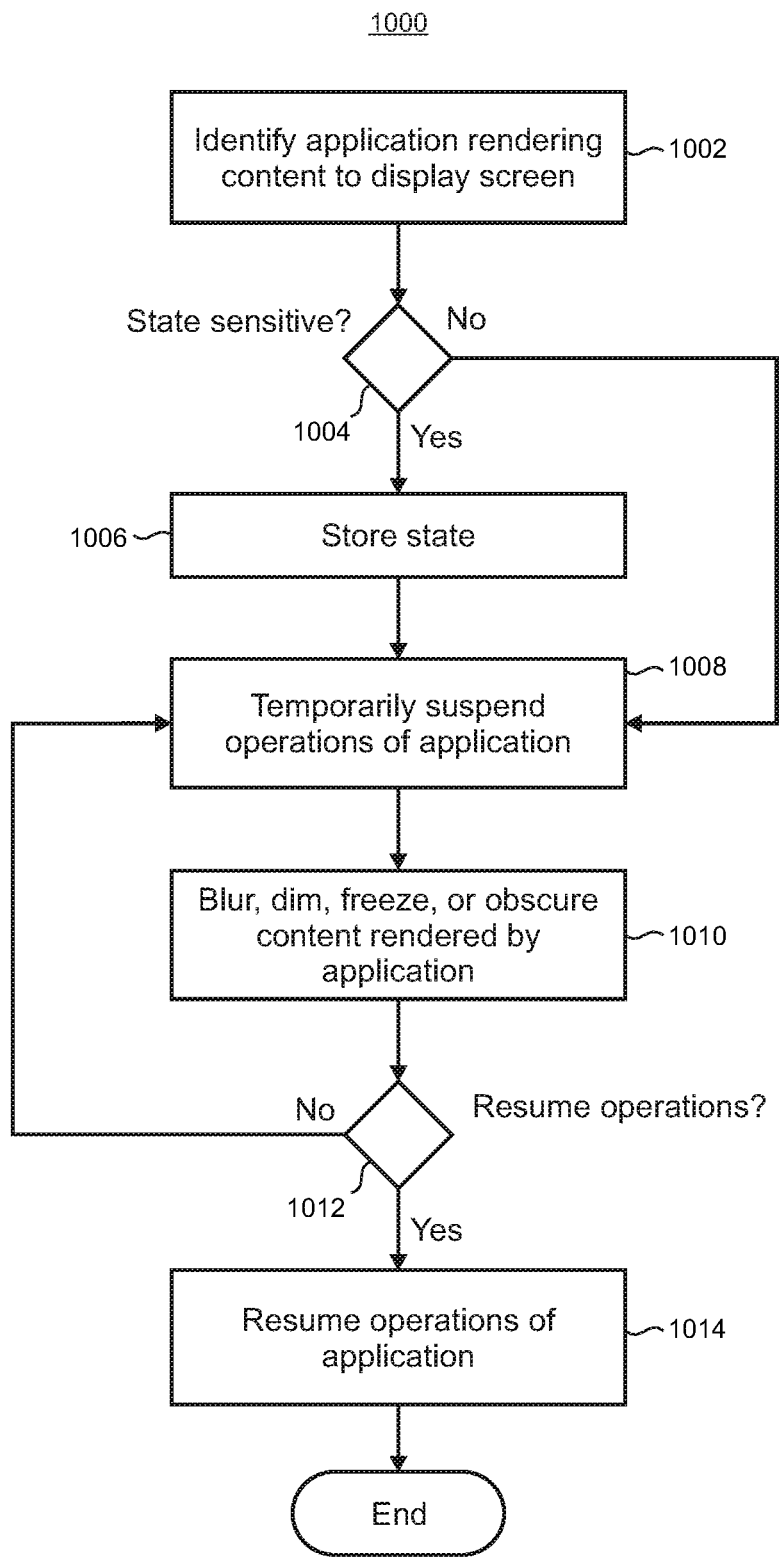
FIG. 10 is a flowchart of an illustrative method of generating an alert.

FIG. 10 is a flowchart of an illustrative method 1000 for outputting the alert 306. The alert 306 allows the user 110 to safely traverse the pedestrian street crossing 304 without loss of state which can be particularly advantageous in application usage scenarios which are state-sensitive. In an illustrative example, the alert may be shown prominently to cover a relatively large portion of the display screen 202 in a manner that interferes with the user's interaction with the content being rendered on the display screen. The alert may further be configured with user controls that allow the user to close the alert and continue with viewing and/or interacting with the previously rendered content.

The alert 306 may also be configured for automatic dismissal in that no user controls are included in the alert. Once the user 110 has traversed the pedestrian street crossing 304 or upon elapse of a time interval that is pre-provisioned into the pedestrian alert system 150, the alert may be automatically dismissed. However, during the time interval in which the alert is active (i.e., not dismissed), it may obscure content that is being rendered by GUI applications on the display screen.

Thus, at step 1002, a foreground application that is rendering content which is currently being viewed by the user 110 is identified. It is determined at step 1004 if the application is state-sensitive. If so, the method proceeds to step 1006 to store the state of the application prior to proceeding to step 1008 to suspend the operations of the application. A snapshot of the application states can be taken and stored prior to suspending the operations at step 1008. If the application is not state-sensitive, for example, if the user is viewing static text or image content, then the method may proceed directly to step 1008 for temporarily suspending the operations of the application.

Suspending or discontinuing the operations of the content-rendering application, may cause a GUI associated with the application to be frozen, blurred, dimmed, or obscured so that the user 110 is no longer able to interact with the GUI. At step 1010, the content 314 around the alert 306 is dimmed, blurred, frozen, or obscured. At step 1012 it is determined if the application should be allowed to resume operations. The application may resume operations at step 1014 when the user dismisses the alert 306 with one of the user controls, or when the user traverses the pedestrian street crossing 304, or when a predetermined time period has elapsed. When the application resumes operation, the user can resume the application without loss of state. The user therefore resumes operation of the application at the same point at which the application was suspended since the state is persisted throughout the time interval during which the operations of the application were suspended.

Figure 11:
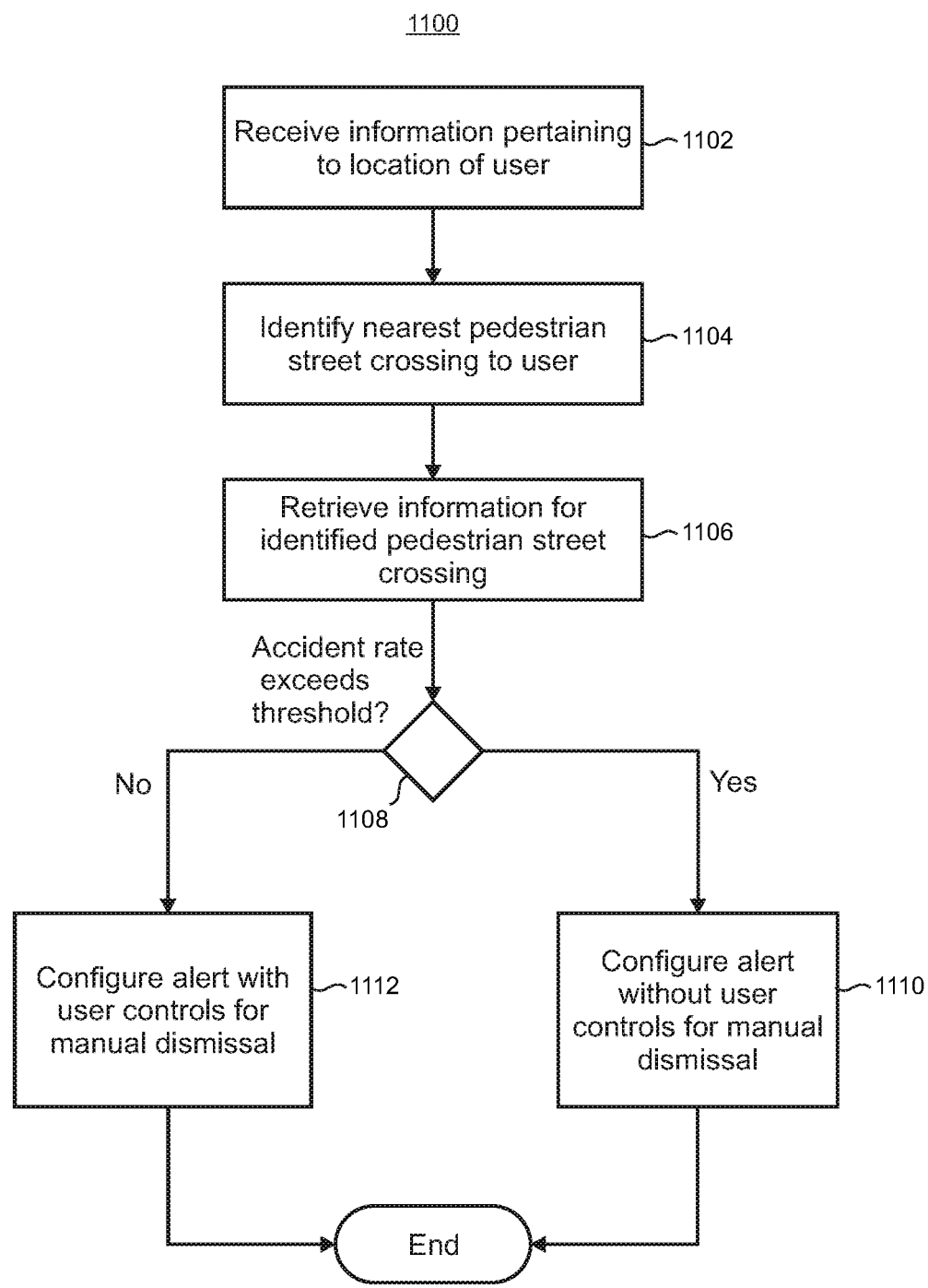
FIG. 11 is a flowchart of an illustrative method of providing data regarding a pedestrian street crossing.

FIG. 11 is a flowchart of an illustrative method 1100 for providing data associated with a pedestrian street crossing which may be executed by the service provider 130. The method begins at step 1102 wherein information regarding a user location such as the GPS coordinates of the user location and a direction of the user's traversal are received. Using the information, the nearest pedestrian street crossing that the user will encounter is identified at step 1104 by comparing the coordinates with mapping data. At step 1106, the information regarding the pedestrian street crossing 304 such as physical characteristics (e.g., width, length, etc.), accident rate, and presence or absence of walk signals can be retrieved. The information can be retrieved from a local database by the service provider 130. In some implementations, the information can be retrieved from a third-party database.

The retrieved accident rate is compared to a predetermined threshold at step 1108. If the accident rate is higher than the predetermined threshold, which may indicate that the pedestrian street crossing is dangerous, then a signal with such information may be transmitted by the service provider 130 to the pedestrian alert system 150. In turn, the pedestrian alert system may configure the alert 306 to show the danger level, or to be more prominently rendered such as appearing as a flashing message. The alert it may be also configured without the user controls to enable manual dismissal in step 1110. In some implementations, the prominence of the alert can be increased by configuring it to be a recurring alert so that the user needs to dismiss the alert repeatedly.

If it is determined at step 1108 that the accident rate is less than the predetermined threshold, the attributes of the alert 306 may be set to include user controls for manual dismissal in step 1112, or the alert can be displayed less prominently, for example, as a transparent overlay with the content 314 behind the alert being blurred, frozen, obscured, or dimmed. The step of comparing the accident rate and determining the danger level associated with the pedestrian street crossing may be executed at the service provider 130 or at the mobile device 105.

Figure 12:
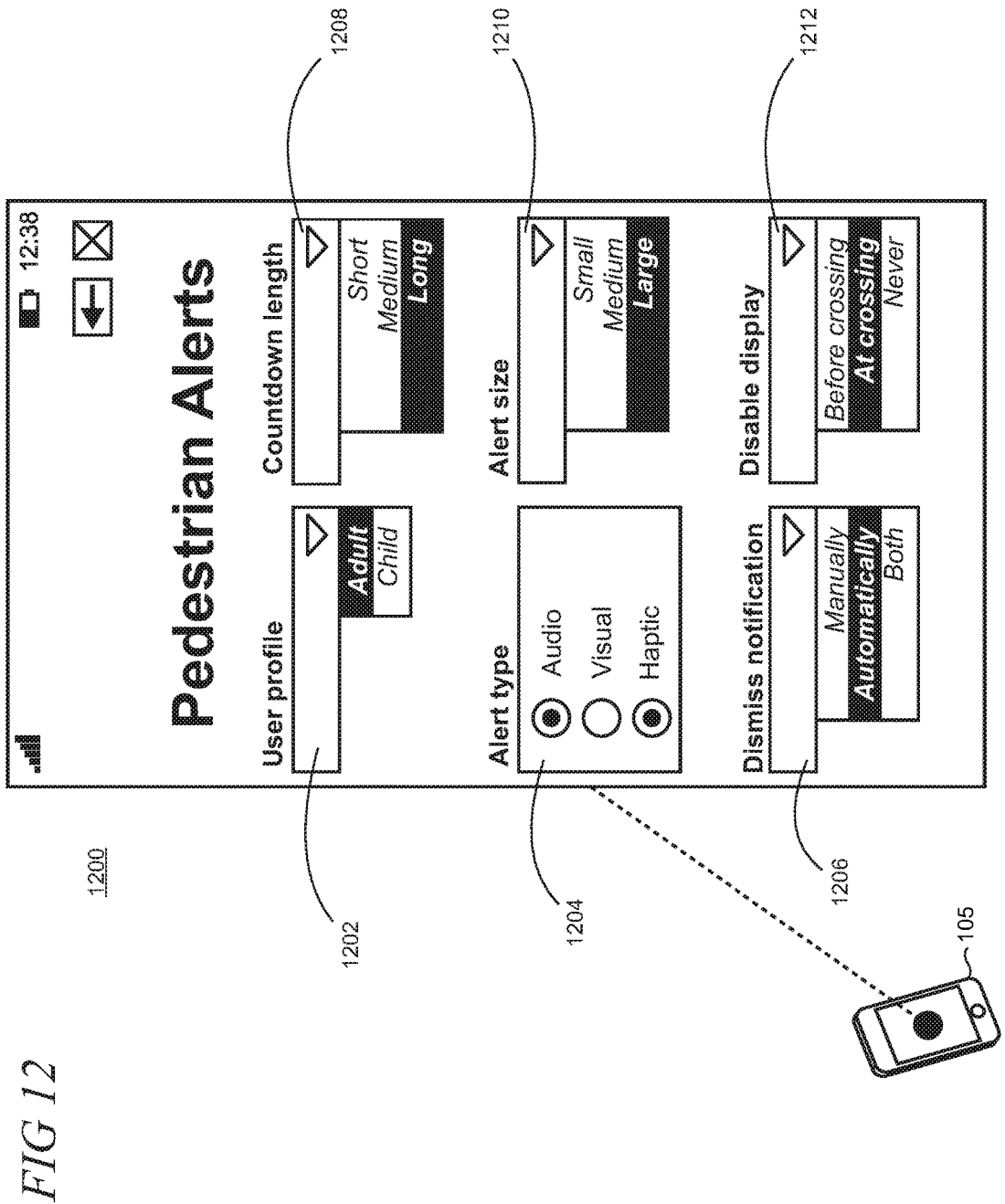
FIG. 12 shows an illustrative user interface configured to collect user preferences for the pedestrian alert system.

FIG. 12 shows an illustrative user interface 1200 that may be exposed by the pedestrian alert system 150 to collect user preferences regarding the alerts for pedestrian street crossings. The user interface 1200 may be configured to enable the user to initially select whether the user profile is for an adult or a child with the user profile dropdown box 1202. Alternatively, the profile can be obtained automatically or partially automatically, for example, using other settings that are applicable to applications and other features on a given mobile device. The user can select one or more of audio, visual, and haptic alerts from option buttons 1204 along with providing whether manual and/or automatic alerts are preferred at dropdown box 1206.

The countdown length dropdown box 1208 allows the user to set how early the alert should be launched to provide advance notice of an upcoming pedestrian street crossing. The alert size dropdown box 1210 allows the user to specify the size of the alert relative to the size of the display screen 202. The disable display screen dropdown box 1212 enables the user to specify if, when the alert appears, she would like to suspend the application and disable the display screen upon reaching the pedestrian street crossing, or prior to reaching the pedestrian street crossing. The user may be provided with contextual help such as tool tip texts explaining the significance of each setting when required to provide the values.

Figure 13:
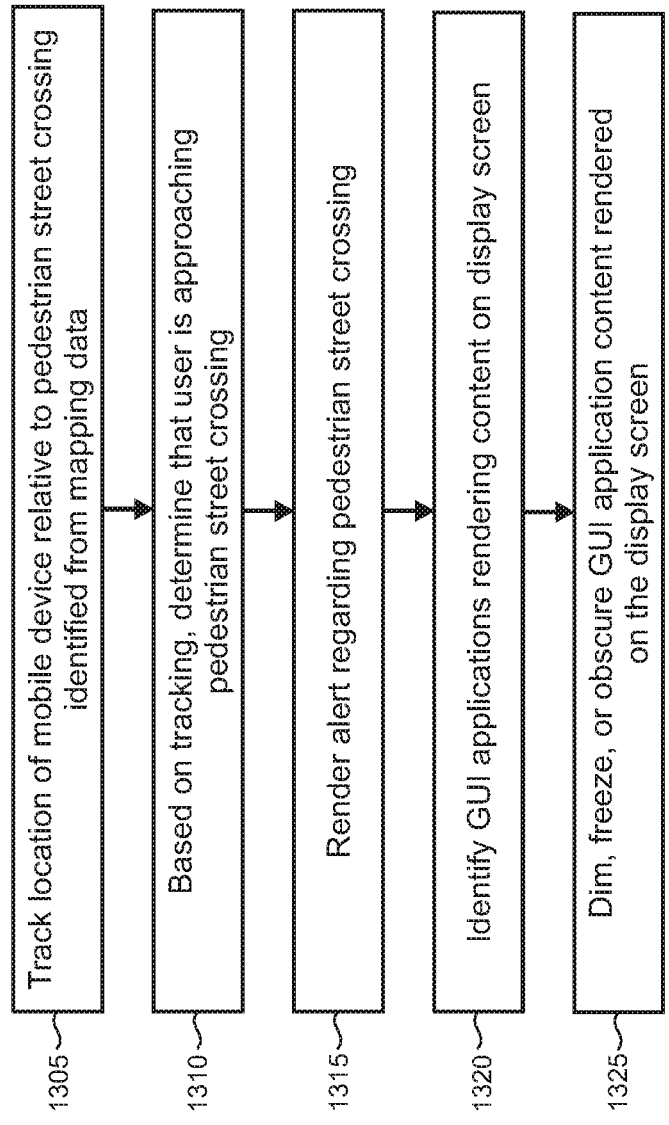
FIGS. 13 and 14 show illustrative methods that may be performed by a mobile device.

FIG. 13 is a flowchart of an illustrative method 1300 that may be implemented on a mobile device (e.g., device 105 in FIG. 1). In step 1305, the location of a mobile device is tracked relative to a pedestrian street crossing that is identified from mapping data. Alternatively, the crossing may be identified using services provided by a mapping application that can operate locally on the device, remotely at a service, or operate using a combination of local and remote resources. In step 1310, the tracking is used to determine that a user is approaching the pedestrian street crossing. In step 1315, an alert regarding the crossing is rendered on the mobile device, for example using graphics, audio, or haptics. In step 1320, GUI applications that are rendering content on the device display screen are identified. In step 1325, the content rendered by the GUI applications is dimmed, frozen, or obscured.

Figure 14:
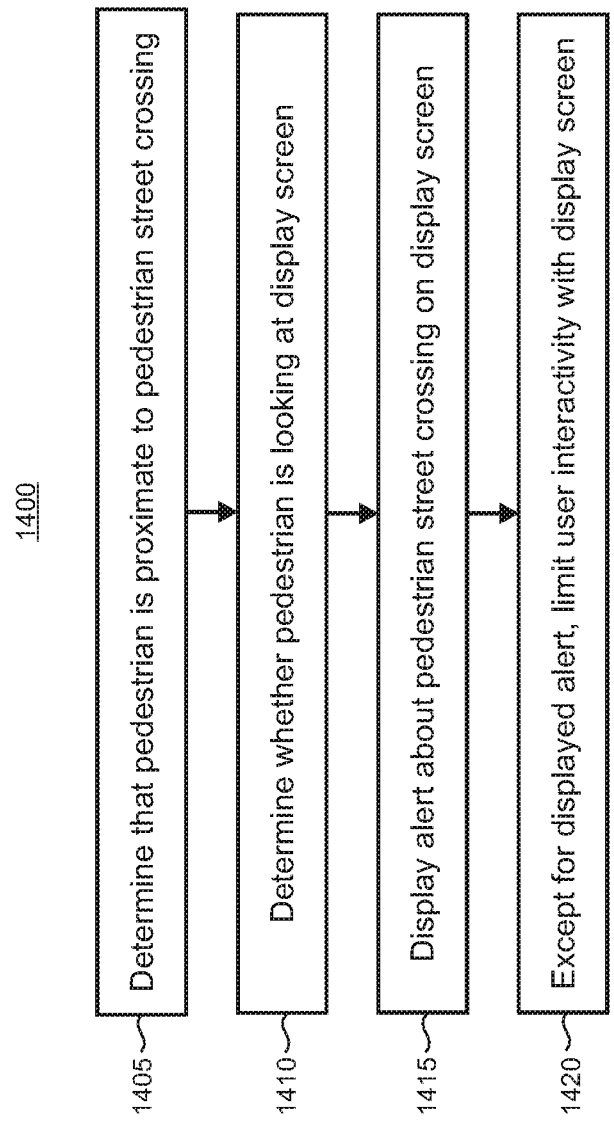

FIG. 14 is a flowchart of an illustrative method 1400 that may be implemented on a mobile device (e.g., device 105 in FIG. 1) that includes a sensor package configured to provide sensor data. In step 1405, a determination is made using sensor data that a pedestrian is proximate to a pedestrian street crossing. In step 1410, a determination is made, using the sensor data, as to whether the pedestrian is looking at the display screen. In step 1415, an alert about the pedestrian street crossing is displayed on the display screen. Except for the displayed alert, user interactivity with the display screen is limited, as shown in step 1420.

Figure 15:
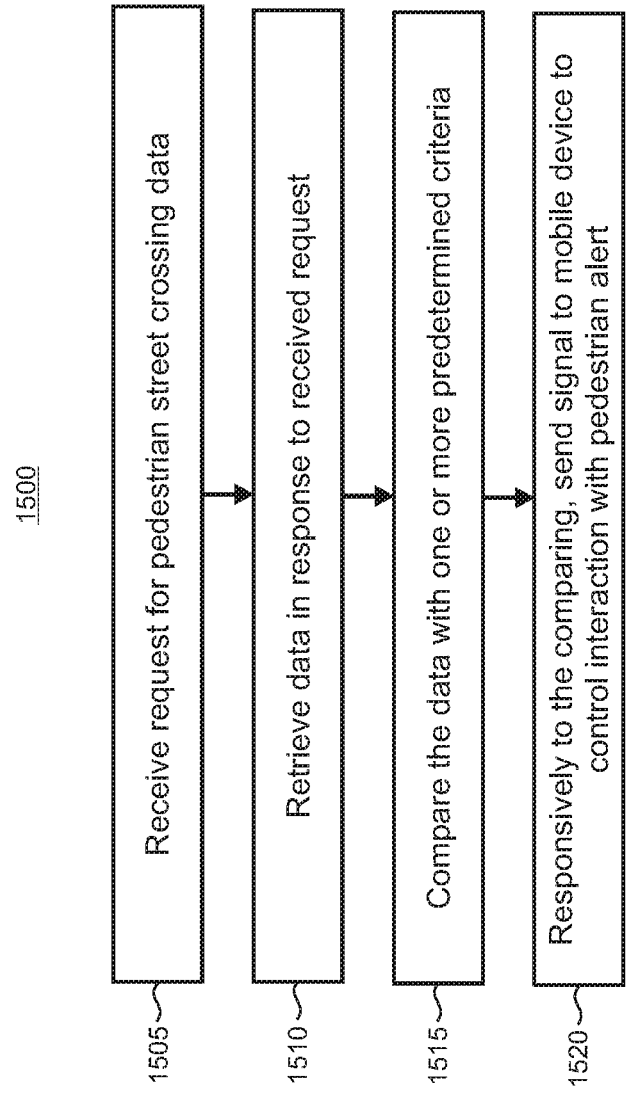
FIG. 15 shows an illustrative method that may be performed by a server that is associated with a service provider.

FIG. 15 is a flowchart of an illustrative method 1500 that may be implemented on a server that is associated with a service provider (e.g., service provider 130 in FIG. 1). In step 1505, the server receives a request for data associated with a pedestrian street crossing. For example, the request can be received from a mobile device (e.g., device 105 in FIG. 1) that supports a pedestrian alert system (e.g., system 150 in FIG. 1). In step 1510, in response to the request, the data is retrieved. For example, the requested data may be retrieved from a local or remote database. In step 1515, the retrieved data is compared against one or more predetermined criteria. Based on the results of the comparing, a signal is sent to a remote mobile device at step 1520 to thereby control user interaction with a pedestrian alert rendered on the mobile device.

Figure 16:
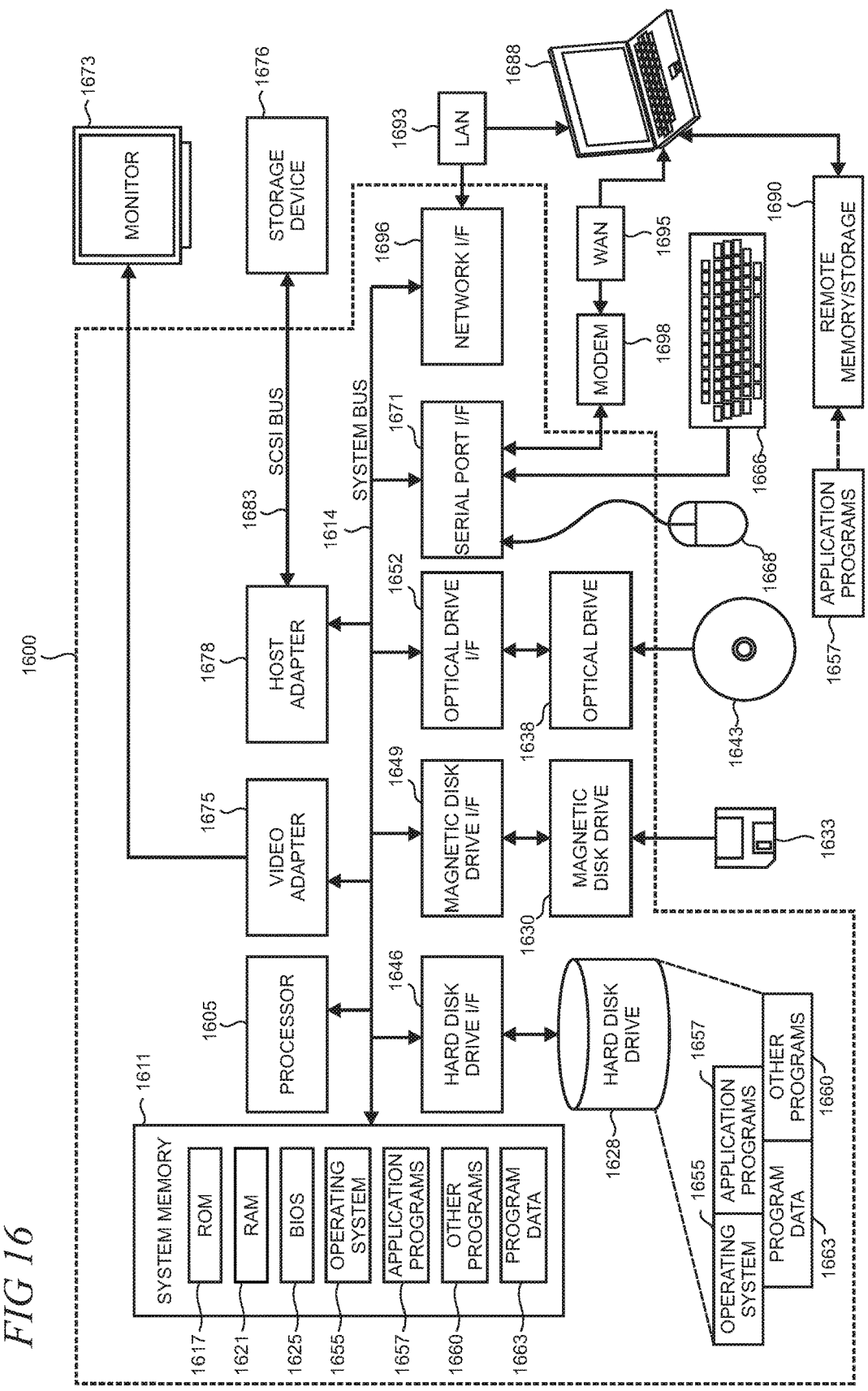
FIG. 16 is a block diagram of an illustrative computer system such as a personal computer (PC) that may be used in part to implement the pedestrian alert system.

FIG. 16 is simplified block diagram of an illustrative computer system 1600 such as a PC, client machine, or server with which the present pedestrian alerts for mobile devices may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk (not shown), a magnetic disk drive 1630 for reading from or writing to a removable magnetic disk 1633 (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively.

The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present pedestrian alerts for mobile devices. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 1633, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666 and pointing device 1668 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 by an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 by a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present pedestrian alerts for mobile devices.

Figure 17:
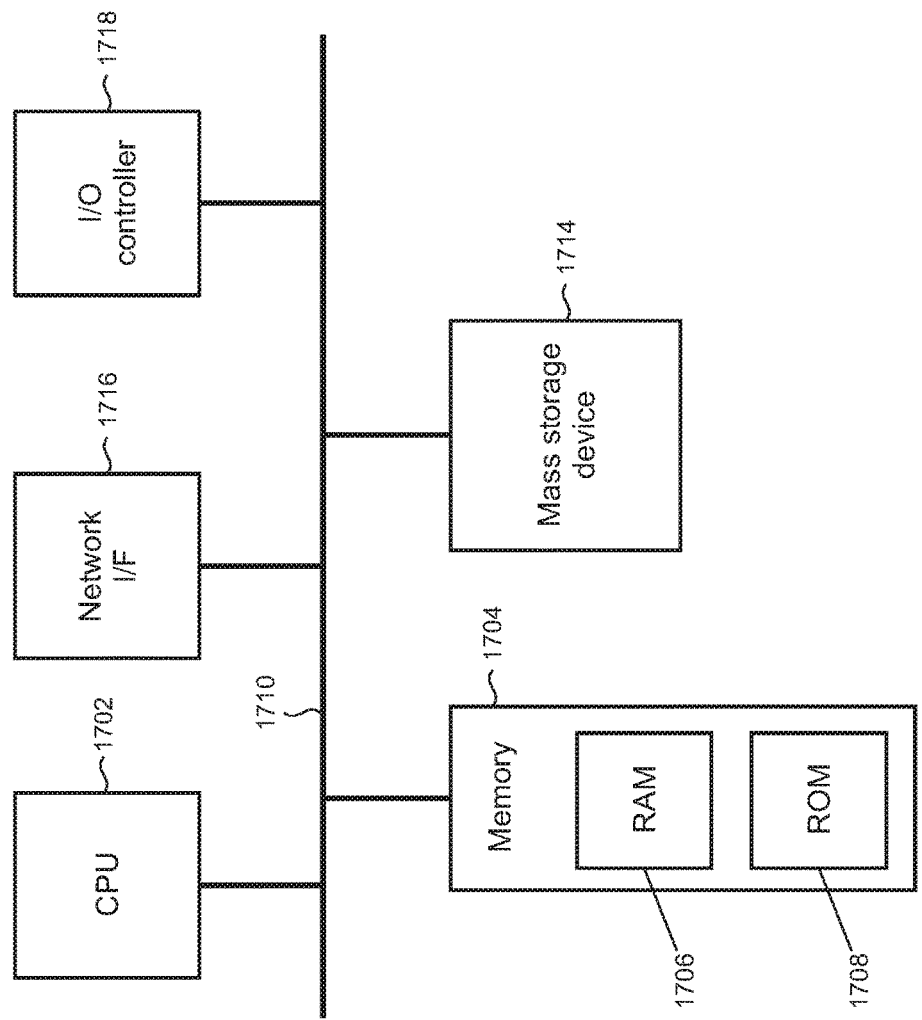
FIG. 17 shows a block diagram of an illustrative device that may be used in part to implement the pedestrian alert system.

FIG. 17 shows an illustrative architecture 1700 for a device capable of executing the various components described herein for providing the present pedestrian alert system. Thus, the architecture 1700 illustrated in FIG. 17 shows an architecture that may be adapted for a server computer, mobile phone, a PDA, a smartphone, a smartwatch, a desktop computer, a netbook computer, a tablet computer, GPS device, gaming console, and/or a laptop computer. The architecture 1700 may be utilized to execute any aspect of the components presented herein.

The architecture 1700 illustrated in FIG. 17 includes a CPU (Central Processing Unit) 1702, a system memory 1704, including a RAM 1706 and a ROM 1708, and a system bus 1710 that couples the memory 1704 to the CPU 1702. A basic input/output system containing the basic routines that help to transfer information between elements within the architecture 1700, such as during startup, is stored in the ROM 1708. The architecture 1700 further includes a mass storage device 1714 for storing software code or other computer-executed code that is utilized to implement applications, the file system, and the operating system discussed herein.

The mass storage device 1714 is connected to the CPU 1702 through a mass storage controller (not shown) connected to the bus 1710. The mass storage device 1714 and its associated computer-readable storage media provide non-volatile storage for the architecture 1700.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1700.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Bluray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It should be appreciated that the network interface unit 1716 also may be utilized to connect to other types of networks and remote computer systems. The architecture 1700 also may include an input/output controller 1718 for receiving and processing input from a number of other devices, including a keyboard, mouse, or electronic stylus (not shown in FIG. 17). Similarly, the input/output controller 1718 may provide output to a display screen, a printer, or other type of output device (also not shown in FIG. 17).

It should be appreciated that the software components described herein may, when loaded into the CPU 1702 and executed, transform the CPU 1702 and the overall architecture 1700 from a general-purpose computing system into a special-purpose computing system customized to facilitate the functionality presented herein. The CPU 1702 may be constructed from any number of transistors or other discrete circuit elements, which may individually or collectively assume any number of states. More specifically, the CPU 1702 may operate as a finite-state machine, in response to executable instructions contained within the software modules disclosed herein. These computer-executable instructions may transform the CPU 1702 by specifying how the CPU 1702 transitions between states, thereby transforming the transistors or other discrete hardware elements constituting the CPU 1702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1700 in order to store and execute the software components presented herein. It also should be appreciated that the architecture 1700 may include other types of computing devices, including handheld computers, embedded computer systems, smartphones, PDAs, smartwatches and other types of computing devices known to those skilled in the art. It is also contemplated that the architecture 1700 may not include all of the components shown in FIG. 17, may include other components that are not explicitly shown in FIG. 17, or may utilize an architecture completely different from that shown in FIG. 17.

Figure 18:
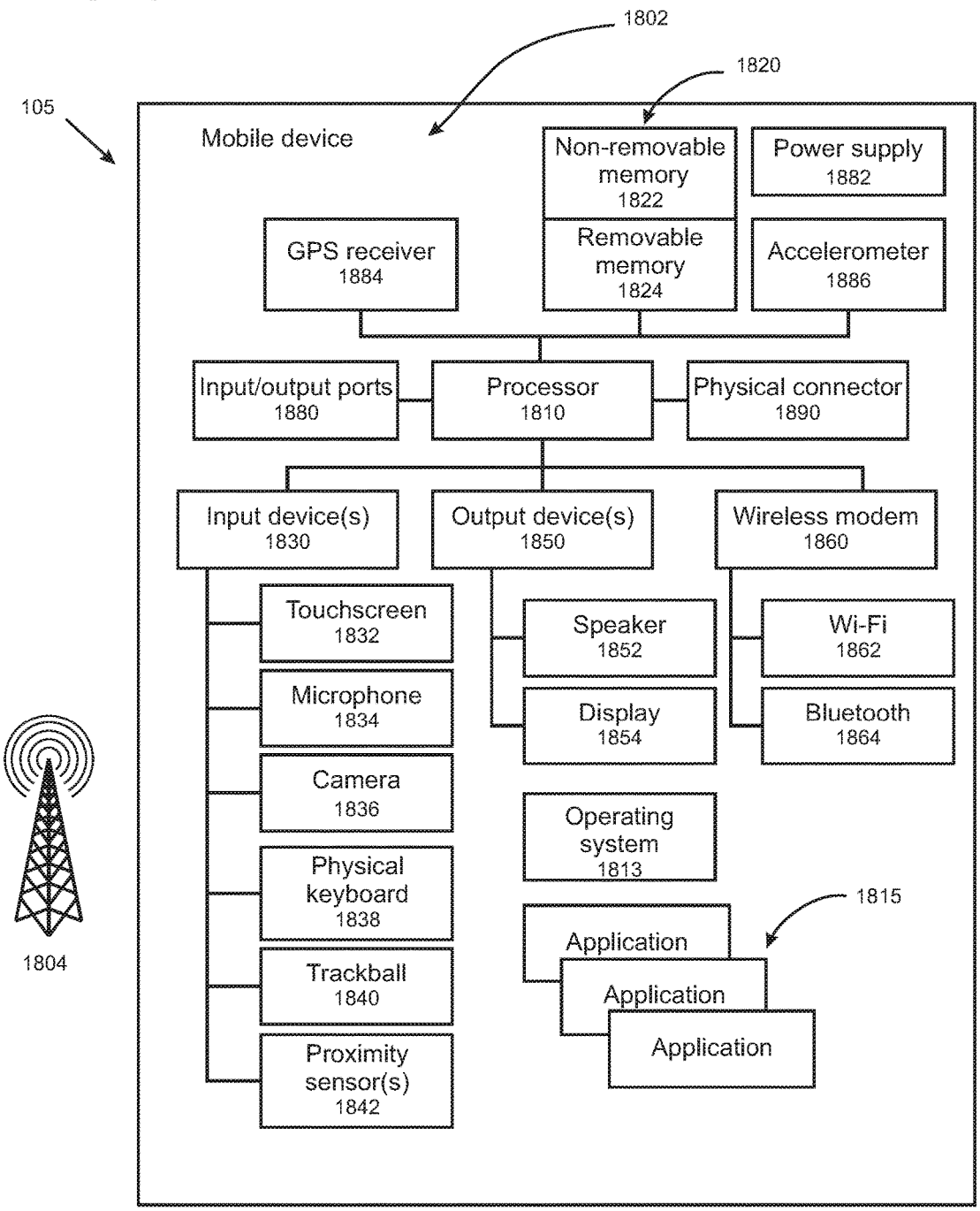
FIG. 18 is a block diagram of an illustrative mobile device.

FIG. 18 is a functional block diagram of an illustrative device 105 such as a mobile phone, a smartphone, a smartwatch or other wearable mobile computing and communication device including a variety of optional hardware and software components, shown generally at 1802. Any component 1802 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1804, such as a cellular or satellite network.

The illustrated device 105 can include a controller or processor 1810 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1813 can control the allocation and usage of the components 1802, including power states, above-lock states, and below-lock states, and provides support for one or more application programs 1815. The application programs can include common mobile computing applications (e.g., image-capture applications, email applications, calendars, contact managers, web browsers, messaging applications), or any other computing application.

The illustrated device 105 can include memory 1820. Memory 1820 can include non-removable memory 1822 and/or removable memory 1824. The non-removable memory 1822 can include RAM, ROM, Flash memory, a hard disk, or other well-known memory storage technologies. The removable memory 1824 can include Flash memory or a Subscriber Identity Module (SIM) card, which is well known in GSM (Global System for Mobile communications) systems, or other well-known memory storage technologies, such as "smart cards." The memory 1820 can be used for storing data and/or code for running the operating system 1813 and its components such as the pedestrian alert system 150 and the application programs 1815. Example data can include web pages, text, images, sound files, video data, or other data sets to be sent to and/or received from one or more network servers or other devices by one or more wired or wireless networks.

The memory 1820 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 105.

The memory 1820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 105 can support one or more input devices 1830; such as a touch screen 1832; microphone 1834 for implementation of voice input for voice recognition, voice commands and the like; camera 1836; physical keyboard 1838; trackball 1840; and/or proximity sensor 1842; and one or more output devices 1850, such as a speaker 1852 and one or more displays 1854. Other input devices (not shown) using gesture recognition may also be utilized in some cases. Other possible output devices (not shown) can include piezoelectric or haptic output devices. Some devices can serve more than one input/output function. For example, touchscreen 1832 and display 1854 can be combined into a single input/output device.

A wireless modem 1860 can be coupled to an antenna (not shown) and can support two-way communications between the processor 1810 and external devices, as is well understood in the art. The modem 1860 is shown generically and can include a cellular modem for communicating with the mobile communication network 1804 and/or other radio-based modems (e.g., Bluetooth 1864 or Wi-Fi 1862). The wireless modem 1860 is typically configured for communication with one or more cellular networks, such as a GSM network for data and voice communications within a single cellular network, between cellular networks, or between the device and a public switched telephone network (PSTN).

The device can further include at least one input/output port 1880, a power supply 1882, a satellite navigation system receiver 1884, such as a GPS receiver, an accelerometer 1886, a gyroscope (not shown), and/or a physical connector 1890, which can be a USB port, IEEE 1394 (FireWire) port, and/or an RS-232 port. The illustrated components 1802 are not required or all-inclusive, as any components can be deleted and other components can be added.

Various exemplary embodiments of the present pedestrian alerts for mobile devices are now presented by way of illustration and not as an exhaustive list of all embodiments. An example includes a method for alerting a user of a mobile device the includes a display screen, comprising: tracking a location of the mobile device relative to a pedestrian street crossing identified from mapping data; based on the tracking, determining that the user is approaching the pedestrian street crossing; rendering an alert to the user regarding the pedestrian street crossing, the alert being active over a time interval; identifying one or more GUI (graphical user interface) applications among a plurality of applications executing on the mobile device, the GUI applications rendering content on the display screen; and dimming, freezing, or obscuring the content rendered by the GUI applications on the display screen.

In another example, the method further comprises: determining whether the user is viewing the display screen; and suspending execution of the GUI applications to limit user interaction with the GUI applications using the display screen during at least a portion of the time interval in which the alert is active. In another example, the method further comprises: taking a snapshot of each state associated with the suspended GUI applications; storing the snapshots of each state; and persisting the stored states during a time interval in which GUI applications are suspended. In another example, the method further comprises: receiving a user input dismissing the alert; and resuming the execution of the GUI applications upon the dismissing. In another example, the rendering of the alert further comprises: calculating a time until the user reaches the pedestrian street crossing based on the tracking; and displaying a countdown using the calculated time. In another example, the rendering an alert to the user further comprises: receiving information regarding characteristics of the pedestrian street crossing; and controlling user interactivity with the alert based on the received information. In another example, the controlled user interactivity includes whether or not the alert is dismissable by the user. In another example, the method further comprises: determining an occurrence of an event, the event including the user completing a traversal of the pedestrian street crossing; and resuming the execution of the GUI applications upon the occurrence. In another example, resuming the execution of the GUI applications further comprises: re-activating respective displays of the GUI applications to enable user interaction with the re-activated displays. In another example, the alert comprises one of visual alert shown on the display screen, auditory alert played through an audio endpoint, or a haptic alert generated by one or more actuators disposed in the mobile device.

A further examples includes a mobile device, comprising: one or more processors; a sensor package configured to provide sensor data to the one or more processors; a display screen enabled for touch-based input from a mobile device user; and one or more hardware-based computer-readable storage devices storing a pedestrian alert system comprising instructions that, when executed by the one or more processors, cause the mobile device to: determine from the sensor data that a pedestrian is proximate to a pedestrian street crossing; determine from the sensor data whether the pedestrian is looking at the display screen; display an alert about the pedestrian street crossing on the display screen; and except for the displayed alert, limit user interactivity with the display screen.

In another example, the pedestrian alert system further comprises instructions that cause the one or more processors to display the alert in a window shown on the display screen, the window showing a countdown until the user interactivity becomes limited. In another example, the pedestrian alert system further comprises instructions that, when executed by the one or more processors, cause the device to: receive an accident rate associated with the pedestrian street crossing; and disable user controls to close the window or dismiss the alert if the accident rate is greater than a predetermined threshold. In another example, the pedestrian alert system further comprises instructions that, when executed by the one or more processors, cause the device to: store a state associated with one or more GUI applications providing respective displays on the display screen; determine from sensor data and mapping data whether the pedestrian has completed traversal of the pedestrian street crossing; automatically dismiss the window upon the completed traversal of the pedestrian street crossing; and re-activate the display screen using the stored state to enable the pedestrian to continue interaction with the GUI applications. In another example, the pedestrian alert system further comprises instructions that, when executed by the processor, cause the device to: determine from sensor data and mapping data that the user has completed traversing the pedestrian street crossing; and re-activate the display screen such that the pedestrian can continue interaction with the GUI applications without loss of state when the pedestrian completes traversing the pedestrian street crossing. In another example, the pedestrian is associated with a profile having different types, and user interactivity with the display screen is selectively controlled by type. In another example, the pedestrian alert system further comprises instructions that, when executed by the processor, cause the device to: receive input from the user dismissing the alert; and responsively to the dismissing, re-activate the display screen such that the pedestrian can continue interaction with the GUI applications without loss of state. In another example, the pedestrian alert system further comprises instructions that, when executed by the processor, cause the device to: continue to execute background or non-visual tasks of one or more applications when user interactivity with the display screen is limited.

A further example includes one or more hardware-based computer-readable storage devices storing computer-executable instructions for: receiving a request for data associated with a pedestrian street crossing, the data including characteristics of an area proximate to the pedestrian street crossing, the characteristics describing one or more of vehicular traffic, physical attributes, or accident history; retrieving data for the pedestrian street crossing responsively to the request; comparing the data for the pedestrian crossing with one or more predetermined criteria; sending a signal to a mobile device to control user interaction with a pedestrian alert rendered on the mobile device responsively to the comparing, wherein the pedestrian alert warns a pedestrian user of the mobile device of a pedestrian street crossing and control of user interactivity with the mobile device is based on the pedestrian user's proximity to the pedestrian street crossing.

In another example, the one or more hardware-based computer-readable storage devices further configured to store computer-executable instructions for: disabling user controls associated with the pedestrian alert when the data is indicative of a high accident rate at the identified pedestrian street crossing relative to the one or more predetermined criteria; and enabling the user controls associated with the pedestrian alert when the data is indicative of a low accident rate at the identified pedestrian street crossing relative to the one or more predetermined criteria.

Based on the foregoing, it should be appreciated that technologies for a pedestrian alert system have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for alerting a user of a mobile device that includes a display screen, comprising:
    tracking a location of the mobile device relative to a pedestrian street crossing identified from mapping data;
    based on the tracking, determining that the user is approaching the pedestrian street crossing;
    rendering an alert to the user regarding the pedestrian street crossing, the alert being active over a time interval;
    identifying one or more GUI (graphical user interface) applications among a plurality of applications executing on the mobile device, the GUI applications rendering content on the display screen;
    dimming, freezing, or obscuring the content rendered by the GUI applications on the display screen;
    determining that the user has completed traversing the pedestrian street crossing; and
    re-activating the display screen such that the user can continue interaction with the GUI applications without loss of state when the user completes traversing the pedestrian street crossing.

2. The method of claim 1 further comprising:
    determining whether the user is viewing the display screen; and
    suspending execution of the GUI applications to limit user interaction with the GUI applications using the display screen during at least a portion of the time interval in which the alert is active.

3. The method of claim 2 further comprising:
    taking a snapshot of each state associated with the suspended GUI applications;
    storing the snapshots of each state; and
    persisting the stored states during a time interval in which GUI applications are suspended.

4. The method of claim 1 further comprising:
    receiving a user input dismissing the alert; and
    resuming the execution of the GUI applications upon the dismissing.

5. The method of claim 1 in which the rendering of the alert further comprises:
    calculating a time until the user reaches the pedestrian street crossing based on the tracking; and
    displaying a countdown using the calculated time.

6. The method of claim 1 in which the rendering an alert to the user further comprises:
    receiving information regarding characteristics of the pedestrian street crossing; and
    controlling user interactivity with the alert based on the received information.

7. The method of claim 6 in which the controlled user interactivity includes whether or not the alert is dismissable by the user.

8. The method of claim 1 in which the alert comprises one of visual alert shown on the display screen, auditory alert played through an audio endpoint, or a haptic alert generated by one or more actuators disposed in the mobile device.

9. A mobile device, comprising:
    one or more processors;
    a sensor package configured to provide sensor data to the one or more processors;
    a display screen enabled for touch-based input from a mobile device user; and
    one or more hardware-based computer-readable storage devices storing a pedestrian alert system comprising instructions that, when executed by the one or more processors, cause the mobile device to:

determine from the sensor data that a pedestrian is proximate to a pedestrian street crossing;

determine from the sensor data whether the pedestrian is looking at the display screen;

display an alert about the pedestrian street crossing on the display screen; and except for the displayed alert, limit user interactivity with the display screen.

10. The mobile device of claim 9 in which the pedestrian alert system further comprises instructions that cause the one or more processors to display the alert in a window shown on the display screen, the window showing a countdown until the user interactivity becomes limited.

11. The mobile device of claim 10 in which the pedestrian alert system further comprises instructions that, when executed by the one or more processors, cause the device to:

receive an accident rate associated with the pedestrian street crossing; and disable user controls to close the window or dismiss the alert if the accident rate is greater than a predetermined threshold.

12. The mobile device of claim 11 in which the pedestrian alert system further comprises instructions that, when executed by the one or more processors, cause the device to:

store a state associated with one or more GUI applications providing respective displays on the display screen;

determine from sensor data and mapping data whether the pedestrian has completed traversal of the pedestrian street crossing;

automatically dismiss the window upon the completed traversal of the pedestrian street crossing; and re-activate the display screen using the stored state to enable the pedestrian to continue interaction with the GUI applications.

13. The mobile device of claim 12 in which the pedestrian alert system further comprises instructions that, when executed by the processor, cause the device to:

determine from sensor data and mapping data that the user has completed traversing the pedestrian street crossing; and re-activate the display screen such that the pedestrian can continue interaction with the GUI applications without loss of state when the pedestrian completes traversing the pedestrian street crossing.

14. The mobile device of claim 9 in which the pedestrian is associated with a profile having different types, and user interactivity with the display screen is selectively controlled by type.

15. The mobile device of claim 9 in which the pedestrian alert system further comprises instructions that, when executed by the processor, cause the device to:

receive input from the user dismissing the alert; and responsively to the dismissing, re-activate the display screen such that the pedestrian can continue interaction with the GUI applications without loss of state.

16. The mobile device of claim 9 in which the pedestrian alert system further comprises instructions that, when executed by the processor, cause the device to:

continue to execute background or non-visual tasks of one or more applications when user interactivity with the display screen is limited.

17. One or more hardware-based computer-readable storage devices storing computer-executable instructions for:

receiving a request for data associated with a pedestrian street crossing, the data including characteristics of an area proximate to the pedestrian street crossing, the characteristics describing one or more of vehicular traffic, physical attributes, or accident history;

retrieving data for the pedestrian street crossing responsively to the request;

comparing the data for the pedestrian crossing with one or more predetermined criteria;

sending a signal to a mobile device to control user interaction with a pedestrian alert rendered on the mobile device responsively to the comparing, wherein the pedestrian alert warns a pedestrian user of the mobile device of a pedestrian street crossing and control of user interactivity with the mobile device is based on the pedestrian user's proximity to the pedestrian street crossing.

18. The one or more hardware-based computer-readable storage devices of claim 17 further storing computer-executable instructions for:

disabling user controls associated with the pedestrian alert when the data is indicative of a high accident rate at the identified pedestrian street crossing relative to the one or more predetermined criteria; and enabling the user controls associated with the pedestrian alert when the data is indicative of a low accident rate at the identified pedestrian street crossing relative to the one or more predetermined criteria.

* * * * *